(12) United States Patent
Tsai et al.

(10) Patent No.: US 9,817,211 B2
(45) Date of Patent: Nov. 14, 2017

(54) OPTICAL LENS SYSTEM WITH A WIDE FIELD OF VIEW

(71) Applicant: NEWMAX TECHNOLOGY CO., LTD., Tai-Chung (TW)

(72) Inventors: Fei-Hsin Tsai, Tai-Chung (TW); Sian-Chih Ke, Tai-Chung (TW)

(73) Assignee: NEWMAX TECHNOLOGY CO., LTD. (TW)

( * ) Notice: Subject to any disclaimer, the term of this patent is extended or adjusted under 35 U.S.C. 154(b) by 0 days.

(21) Appl. No.: 14/985,325

(22) Filed: Dec. 30, 2015

(65) Prior Publication Data

US 2017/0192201 A1    Jul. 6, 2017

(51) Int. Cl.
| | | |
|---|---|---|
| *G02B 13/18* | (2006.01) | |
| *G02B 9/34* | (2006.01) | |
| *G02B 13/00* | (2006.01) | |
| *G02B 27/00* | (2006.01) | |
| *G02B 5/20* | (2006.01) | |

(52) U.S. Cl.
CPC ........... *G02B 13/004* (2013.01); *G02B 5/208* (2013.01); *G02B 9/34* (2013.01); *G02B 27/0025* (2013.01); *G02B 27/0081* (2013.01)

(58) Field of Classification Search
CPC ........ G02B 13/004; G02B 9/34; G02B 5/208; G02B 27/0025; G02B 27/0081
See application file for complete search history.

(56) References Cited

U.S. PATENT DOCUMENTS

| | | | |
|---|---|---|---|
| 8,335,043 B2 | 12/2012 | Huang | |
| 8,395,853 B2 | 3/2013 | Chen et al. | |
| 8,576,497 B2 | 11/2013 | Hsu et al. | |
| 8,593,737 B2 | 11/2013 | Tang et al. | |
| 2015/0160437 A1* | 6/2015 | Wang | G02B 13/004 348/335 |
| 2016/0154207 A1* | 6/2016 | Son | G02B 13/22 359/715 |
| 2016/0274330 A1* | 9/2016 | Chiang | G02B 13/004 |

* cited by examiner

*Primary Examiner* — Alicia M Harrington
(74) *Attorney, Agent, or Firm* — Bruce Stone LLP; Joseph Bruce

(57) ABSTRACT

An optical lens system with a wide field of view includes, in order from the object side to the image side: a stop, a first lens element with a positive refractive power, a second lens element with a negative refractive power, a third lens element with a positive refractive power, and a fourth lens element with a negative refractive power. The focal length of the first lens element is f1, the focal length of the second lens element and the third lens element combined is f23, and they satisfy the relation: 0.4<f1/f23<1.7. When the above relation is satisfied, a wide field of view can be obtained and the resolution can be improved evidently.

14 Claims, 16 Drawing Sheets

OPTICAL LENS SYSTEM WITH A WIDE FIELD OF VIEW

BACKGROUND OF THE INVENTION

Field of the Invention

The present invention relates to an optical lens system, and more particularly to a miniaturized four-piece optical lens system with a wide field of view.

Related Prior Art

In recent years, with the popularity of electronic products with the function of taking photographs, there's an increasing demand for an optical lens system. In order to obtain a wider shooting range, the lens angle should meet certain requirements. The field of view of the lens is usually designed to be 50 to 60 degrees, if over the above designed angle, the aberration will be larger and the lens design will be more complex. For example, the optical lens systems as disclosed in U.S. Pat. Nos. 8,335,043 and 8,576,497 use two lens groups and 5-6 pieces of lens elements to obtain a wide field of view, however, their distortion is increased. The optical lens systems as disclosed in U.S. Pat. Nos. 8,593,737, 8,576,497 and 8,395,853 also have a wide field of view, but their TL (total length) of the entire optical lens system is too long.

Therefore, the motivation of the present invention is to develop a miniaturized optical lens system which not only can be applied to the lenses of electronic products, such as digital camera, Webcam, mobile phone, but also has a wide field of view and a reduced aberration, so as to reduce the design complexity of the lens system.

SUMMARY

The present invention is aimed at providing a four-piece optical lens system which has a wide field of view, high resolution, short length and less distortion.

An optical lens system with a wide field of view in accordance with the present invention, in order from an object side to an image side, comprises: a stop; a first lens element with a positive refractive power, having an object-side surface being convex near an optical axis and an image-side surface being convex near the optical axis, at least one of the object-side surface and the image-side surface of the first lens element being aspheric; a second lens element with a negative refractive power, having an object-side surface being concave near the optical axis, at least one of the object-side surface and an image-side surface of the second lens element being aspheric; a third lens element with a positive refractive power, having an image-side surface being convex near the optical axis, at least one of an object-side surface and the image-side surface of the third lens element being aspheric; and a fourth lens element with a negative refractive power, having an object-side surface being convex near the optical axis, at least one of the object-side surface and an image-side surface of the fourth lens element being aspheric and provided with at least one inflection point.

The focal length of the first lens element is f1, the focal length of the second lens element and the third lens element combined is f23, and they satisfy the relation: $0.4<f1/f23<1.7$.

When the above relation is satisfied, a wide field of view can be obtained and the resolution can be improved evidently.

Preferably, the third lens element has an object-side surface being concave near the optical axis, and the fourth lens element has an image-side surface being concave near the optical axis.

Preferably, the focal length of the first lens element is f1, a focal length of the second lens element is f2, and they satisfy the relation: $-0.9<f1/f2<-0.3$, so that the refractive power of the first lens element and the second lens element are more suitable, it will be favorable to obtain a wide field of view and avoid the excessive increase of aberration of the system.

Preferably, the focal length of the second lens element is f2, a focal length of the third lens element is f3, and they satisfy the relation: $-4.2<f2/f3<-1.3$, so that the refractive power of the second lens element and the third lens element are more balanced, it will be favorable to correct the aberration of the system and reduce the sensitivity of the system.

Preferably, the focal length of the third lens element is f3, a focal length of the fourth lens element is f4, and they satisfy the relation: $-1.1<f3/f4<-0.4$, so that the telephoto structure formed by the positive and negative third and fourth lens elements can effectively reduce the total length of the optical lens system.

Preferably, the focal length of the first lens element is f1, the focal length of the third lens element is f3, and they satisfy the relation: $0.7<f1/f3<2.1$, so that the positive refractive power of the first lens element can be distributed effectively, so as to reduce the sensitivity of the optical lens system with a wide field of view.

Preferably, the focal length of the second lens element is f2, the focal length of the fourth lens element is f4, and they satisfy the relation: $0.55<f2/f4<4.0$, so that the distribution of the negative refractive power will be appropriate, it will be favorable to correct the aberration of the system and improve the image quality.

Preferably, the focal length of the second lens element and the third lens element combined is f23, the focal length of the fourth lens element is f4, and they satisfy the relation: $-1.3<f23/f4<-0.6$, so that a wide field of view can be obtained and the resolution can be improved evidently.

Preferably, a focal length of the first lens element and the second lens element combined is f12, a focal length of the third lens element and the fourth lens element combined is f34, and they satisfy the relation: $0.3<f12/f34<2.2$, which is favorable to obtain a wide field of view, and effectively correct image distortion.

Preferably, a focal length of the optical lens system with a wide field of view is f, a distance from the object-side surface of the first lens element to the image plane along the optical axis is TL, and they satisfy the relation: $0.5<f/TL<0.8$. When this relation is satisfied, it will be favorable to obtain a wide field of view and maintain the objective of miniaturization of the optical lens system with a wide field of view, and the lens system can be used in thin and light electronic products.

Preferably, the optical lens system has a maximum view angle FOV, and it satisfies the relation: $75<FOV<95$, so that the optical lens system will have an appropriately large field of view.

Preferably, a central thickness of the first lens element along the optical axis is CT1, a central thickness of the second lens element along the optical axis is CT2, and they satisfy the following relation: $0.2<CT2/CT1<0.7$, so that the second and third lens elements will have an appropriate thickness to facilitate the injection molding process.

Preferably, a distance along the optical axis between the first lens element and the second lens element is T12, the central thickness of the second lens element along the optical axis is CT2, and they satisfy the following relation: 0.05<T12/CT2<1.25, so that the field of view of the optical lens system can further be widened.

Preferably, a radius of curvature of the image-side surface of the first lens element is R2, a radius of curvature of the object-side surface of the second lens element is R3, and they satisfy the following relation: 0.01<R2/R3<4.3, which can reduce the spherical aberration and astigmatism of the optical lens system effectively.

Preferably, an Abbe number of the first lens element is V1, an Abbe number of the second lens element is V2, and they satisfy the following relation: 30<V1-V2<42, which can reduce the spherical aberration and astigmatism of the optical lens system effectively.

DETAILED DESCRIPTION

The present invention will be clearer from the following description when viewed together with the accompanying drawings, which show, for purpose of illustrations only, the preferred embodiment in accordance with the present invention.

Figure 1A:
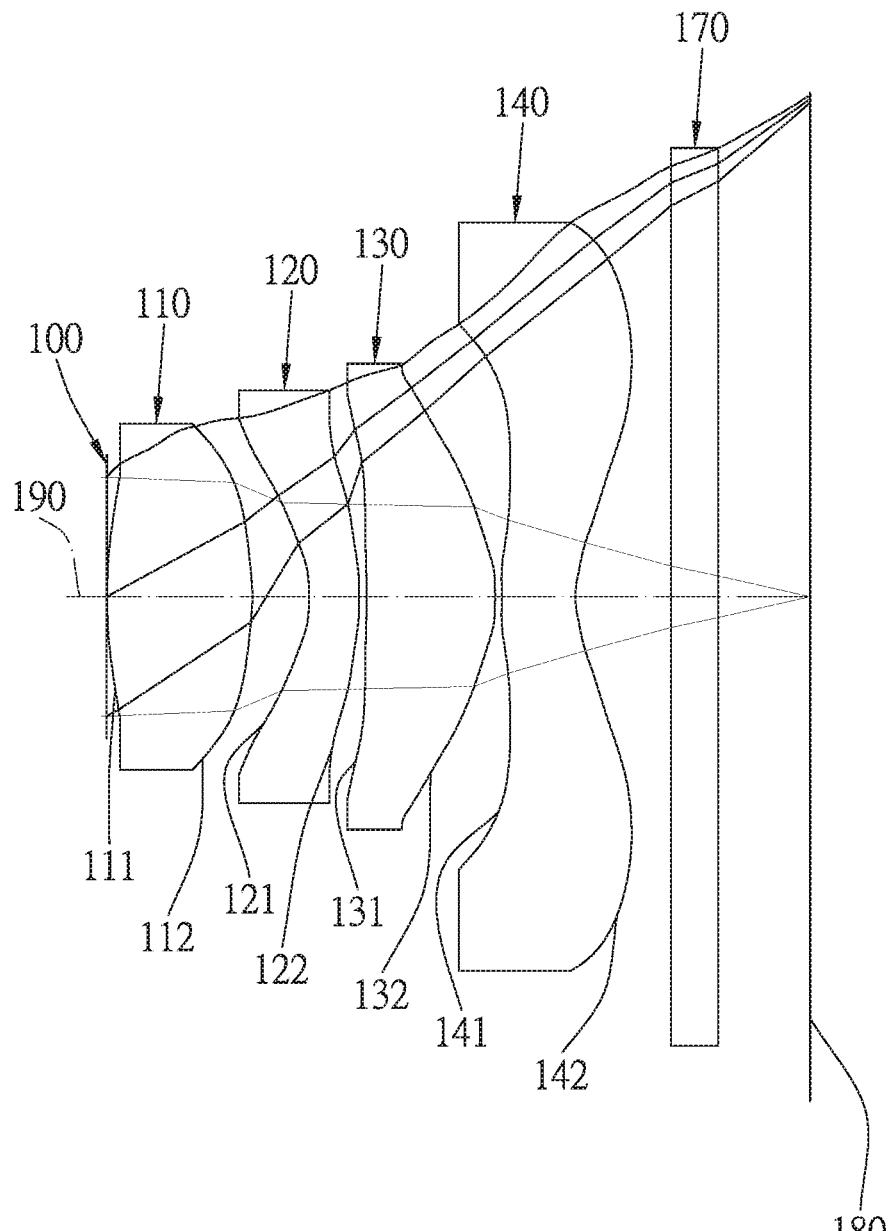
FIG. 1A shows an optical lens system with a wide field of view in accordance with a first embodiment of the present invention.
Figure 1B:
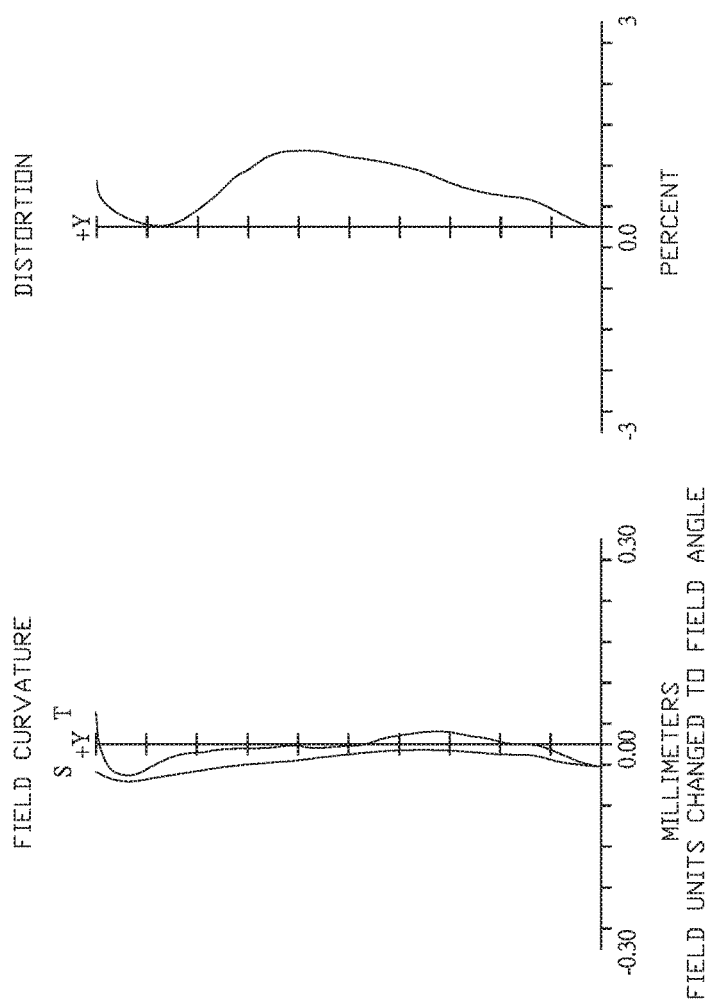
FIG. 1B shows the longitudinal spherical aberration curve, the astigmatic field curve and the distortion curve of the first embodiment of the present invention.

Referring to FIGS. 1A and 1B, FIG. 1A shows an optical lens system with a wide field of view in accordance with a first embodiment of the present invention, and FIG. 1B shows, in order from left to right, the longitudinal spherical aberration curves, the astigmatic field curves, and the distortion curve of the first embodiment of the present invention. An optical lens system with a wide field of view in accordance with the first embodiment of the present invention comprises a stop 100 and a lens group. The lens group comprises, in order from an object side to an image side: a first lens element 110, a second lens element 120, a third lens element 130, a fourth lens element 140, an IR cut filter 170 which is made of glass, and an image plane 180, wherein the optical lens system with a wide field of view has a total of four lens elements with refractive power. The stop 100 is disposed between an image-side surface 112 of the first lens element 110 and an object to be imaged.

The first lens element 110 with a positive refractive power has an object-side surface 111 being convex near an optical axis 190 and the image-side surface 112 being convex near the optical axis 190, the object-side surface 111 and the image-side surface 112 are aspheric, and the first lens element 110 is made of plastic material.

The second lens element 120 with a negative refractive power has an object-side surface 121 being concave near the optical axis 190 and an image-side surface 122 being convex near the optical axis 190, the object-side surface 121 and the image-side surface 122 are aspheric, and the second lens element 120 is made of plastic material.

The third lens element 130 with a positive refractive power has an object-side surface 131 being concave near the optical axis 190 and an image-side surface 132 being convex near the optical axis 190, the object-side surface 131 and the image-side surface 132 are aspheric, the third lens element 130 is made of plastic material.

The fourth lens element 140 with a negative refractive power has an object-side surface 141 being convex near the optical axis 190 and an image-side surface 142 being concave near the optical axis 190, the object-side surface 141 and the image-side surface 142 are aspheric, and the fourth lens element 140 is made of plastic material, and at least one of the object-side surface 141 and the image-side surface 142 is provided with at least one inflection point.

The IR cut filter 170 made of glass is located between the fourth lens element 140 and the image plane 180 and has no influence on the focal length of the optical lens system with a wide field of view.

The equation for the aspheric surface profiles of the respective lens elements of the first embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, G, . . . : represent the high-order aspheric coefficients.

In the first embodiment of the present optical lens system with a wide field of view, the focal length of the optical lens system with a wide field of view is f, the f-number of the optical lens system with a wide field of view is Fno, the optical lens system with a wide field of view has a maximum view angle (field of view) FOV, and they satisfy the relations:

f=1.978 mm;
Fno=2.0; and
FOV=88 degrees.

In the first embodiment of the present optical lens system with a wide field of view, a focal length of the second lens element 120 and the third lens element 130 combined is f23, a focal length of the fourth lens element 140 is f4, and they satisfy the relation: f23/f4=−1.0061.

In the first embodiment of the present optical lens system with a wide field of view, a focal length of the first lens element 110 is f1, a focal length of the second lens element 120 is f2, and they satisfy the relation: f1/f2=−0.6443.

In the first embodiment of the present optical lens system with a wide field of view, the focal length of the second lens element 120 is f2, a focal length of the third lens element 130 is f3, and they satisfy the relation: f2/f3=−2.2334.

In the first embodiment of the present optical lens system with a wide field of view, the focal length of the third lens element 130 is f3, the focal length of the fourth lens element 140 is f4, and they satisfy the relation: f3/f4=−0.8555.

In the first embodiment of the present optical lens system with a wide field of view, the focal length of the first lens element 110 is f1, the focal length of the third lens element 130 is f3, and they satisfy the relation: f1/f3=1.4389.

In the first embodiment of the present optical lens system with a wide field of view, the focal length of the second lens element 120 is f2, the focal length of the fourth lens element 140 is f4, and they satisfy the relation: f2/f4=1.9107.

In the first embodiment of the present optical lens system with a wide field of view, a focal length of the first lens element 110 is f1, the focal length of the second lens element 120 and the third lens element 130 combined is f23, and they satisfy the relation: f1/f23=1.2235.

In the first embodiment of the present optical lens system with a wide field of view, a focal length of the first lens element 110 and the second lens element 120 combined is f12, a focal length of the third lens element 130 and the fourth lens element 140 combined is f34, and they satisfy the relation: f12/f34=1.0944.

In the first embodiment of the present optical lens system with a wide field of view, the focal length of the optical lens system with a wide field of view is f, the distance from the object-side surface 111 of the first lens element 110 to the image plane 180 along the optical axis 190 is TL, and they satisfy the relation: f/TL=0.6571.

In the first embodiment of the present optical lens system, a central thickness of the first lens element 110 along the optical axis 190 is CT1, a central thickness of the second lens element 120 along the optical axis 190 is CT2, and they satisfy the following relation: CT2/CT1=0.3537.

In the first embodiment of the present optical lens system, a distance along the optical axis 190 between the first lens element 110 and the second lens element 120 is T12, the central thickness of the second lens element 120 along the optical axis 190 is CT2, and they satisfy the following relation: T12/CT2=1.1152.

In the first embodiment of the present optical lens system, a radius of curvature of the image-side surface 112 of the first lens element 110 is R2, a radius of curvature of the object-side surface 121 of the second lens element 120 is R3, and they satisfy the following relation: R2/R3=2.8890.

In the first embodiment of the present optical lens system, an Abbe number of the first lens element 110 is V1, an Abbe number of the second lens element 120 is V2, and they satisfy the following relation: V1-V2=32.1.

The detailed optical data of the first embodiment is shown in table 1, and the aspheric surface data is shown in table 2.

TABLE 1

Embodiment 1
f(focal length) = 1.978 mm, Fno = 2.0, FOV = 88 deg.

| surface | | Curvature Radius | Thickness | Material | index | Abbe # | Focal length |
|---|---|---|---|---|---|---|---|
| 0 | object | infinity | infinity | | | | |
| 1 | | infinity | 0 | | | | |
| 2 | stop | infinity | 0 | | | | |
| 3 | Lens 1 | 1.691 (ASP) | 0.614 | plastic | 1.544 | 56.000 | 1.707 |
| 4 | | −1.812 (ASP) | 0.242 | | | | |
| 5 | Lens 2 | −0.627 (ASP) | 0.217 | plastic | 1.634 | 23.900 | −2.649 |
| 6 | | −1.130 (ASP) | 0.030 | | | | |
| 7 | Lens 3 | −3.461 (ASP) | 0.552 | plastic | 1.544 | 56.000 | 1.186 |
| 8 | | −0.577 (ASP) | 0.028 | | | | |
| 9 | Lens 4 | 1.640 (ASP) | 0.314 | plastic | 1.535 | 56.000 | −1.387 |
| 10 | | 0.478 (ASP) | 0.400 | | | | |
| 11 | IR-filter | infinity | 0.210 | glass | 1.517 | 64.167 | — |
| 12 | | infinity | 0.402 | | | | |
| 13 | Image plane | infinity | infinity | | | | |

TABLE 2

| | Aspheric Coefficients | | | |
|---|---|---|---|---|
| surface | 3 | 4 | 5 | 6 |
| K: | −5.8587E+00 | 1.8903E+00 | −8.1086E−01 | −4.9271E−01 |
| A: | −9.8412E−02 | −4.4216E−01 | −4.7576E−01 | 3.5289E−01 |
| B: | 9.9580E−01 | −6.4736E−01 | 2.3122E+00 | −2.8307E−01 |
| C: | −9.7702E+00 | 3.1887E+00 | 8.7118E+00 | 2.7736E+00 |
| D: | 2.0595E+01 | −3.4181E+00 | −3.9539E+01 | −4.6102E+00 |
| E: | 2.5537E+01 | −9.2558E−01 | 5.4948E+01 | 1.3890E+00 |
| F: | −1.3164E+02 | −3.3760E+00 | −2.7208E+01 | 1.1157E+00 |
| surface | 7 | 8 | 9 | 10 |
| K: | −1.4338E+01 | −2.5731E+00 | −6.9031E+01 | −5.4102E+00 |
| A: | 6.0070E−01 | 4.8883E−01 | 1.7709E−01 | −1.5011E−01 |
| B: | −7.2859E−01 | −1.3709E+00 | −1.1699E+00 | −3.2900E−02 |
| C: | −3.0462E+00 | 2.8125E+00 | 1.6909E+00 | 7.4496E−02 |
| D: | 1.0184E+01 | −5.7915E+00 | −1.9972E+00 | −5.4250E−02 |
| E: | −1.2858E+01 | 6.1961E+00 | 1.6801E+00 | 2.3162E−02 |
| F: | 6.7882E+00 | −2.1494E+00 | −5.9529E−01 | −4.6300E−03 |

The units of the radius of curvature, the thickness and the focal length in table 1 are expressed in mm, the surface numbers 0-13 represent the surfaces sequentially arranged from the object-side to the image-side along the optical axis. In table 2, k represents the conic coefficient of the equation of the aspheric surface profiles, and A, B, C, D, E, G, . . . : represent the high-order aspheric coefficients. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
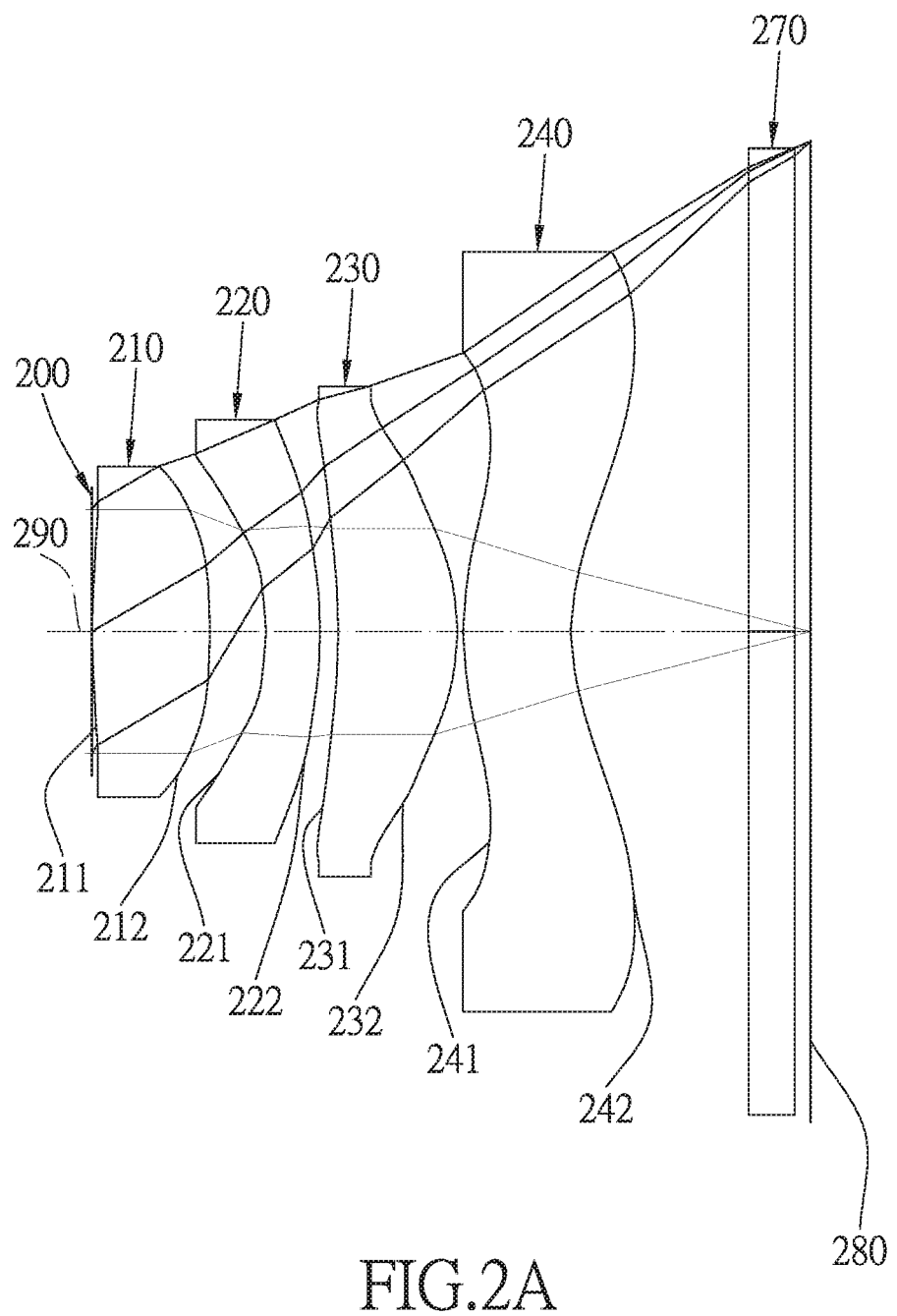
FIG. 2A shows an optical lens system with a wide field of view in accordance with a second embodiment of the present invention.
Figure 2B:
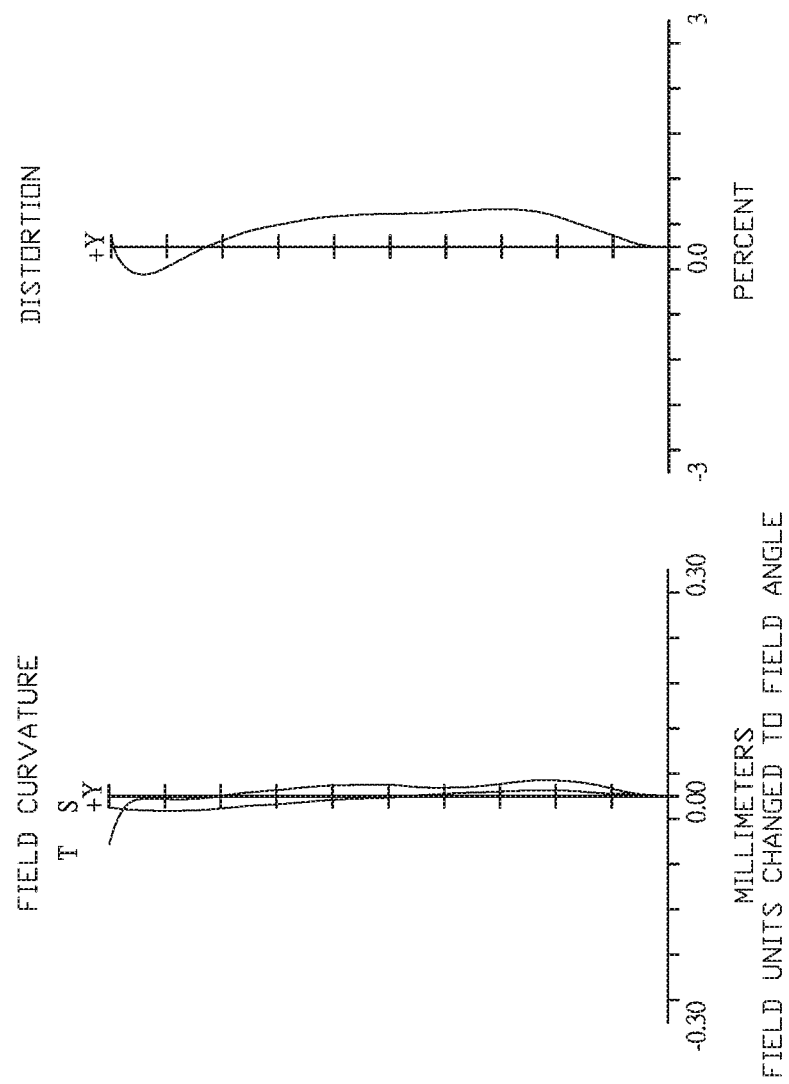
FIG. 2B shows the longitudinal spherical aberration curve, the astigmatic field curve and the distortion curve of the second embodiment of the present invention.

Referring to FIGS. 2A and 2B, FIG. 2A shows an optical lens system with a wide field of view in accordance with a second embodiment of the present invention, and FIG. 2B shows, in order from left to right, the longitudinal spherical aberration curves, the astigmatic field curves, and the distortion curve of the second embodiment of the present invention. An optical lens system with a wide field of view in accordance with the second embodiment of the present invention comprises a stop 200 and a lens group. The lens group comprises, in order from an object side to an image side: a first lens element 210, a second lens element 220, a third lens element 230, a fourth lens element 240, an IR cut filter 270 which is made of glass, and an image plane 280, wherein the optical lens system with a wide field of view has a total of four lens elements with refractive power. The stop 200 is disposed between an image-side surface 212 of the first lens element 210 and an object to be imaged.

The first lens element 210 with a positive refractive power has an object-side surface 211 being convex near an optical axis 290 and the image-side surface 212 being convex near the optical axis 290, the object-side surface 211 and the image-side surface 212 are aspheric, and the first lens element 210 is made of plastic material.

The second lens element 220 with a negative refractive power has an object-side surface 221 being concave near the optical axis 290 and an image-side surface 222 being convex near the optical axis 290, the object-side surface 221 and the image-side surface 222 are aspheric, and the second lens element 220 is made of plastic material.

The third lens element 230 with a positive refractive power has an object-side surface 231 being concave near the optical axis 290 and an image-side surface 232 being convex near the optical axis 290, the object-side surface 231 and the image-side surface 232 are aspheric, the third lens element 230 is made of plastic material.

The fourth lens element 240 with a negative refractive power has an object-side surface 241 being convex near the optical axis 290 and an image-side surface 242 being concave near the optical axis 290, the object-side surface 241 and the image-side surface 242 are aspheric, and the fourth lens element 240 is made of plastic material, and at least one of the object-side surface 241 and the image-side surface 242 is provided with at least one inflection point.

The IR cut filter 270 made of glass is located between the fourth lens element 240 and the image plane 280 and has no influence on the focal length of the optical lens system with a wide field of view.

TABLE 3

| | | Embodiment 2 f(focal length) = 1.989 mm, Fno = 2.0, FOV = 88 deg. | | | | | |
|---|---|---|---|---|---|---|---|
| surface | | Curvature Radius | | Thickness | Material | index | Abbe # | Focal length |
| 0 | object | infinity | | infinity | | | | |
| 1 | | infinity | | 0 | | | | |
| 2 | stop | infinity | | 0 | | | | |
| 3 | Lens 1 | 2.470 | (ASP) | 0.529 | plastic | 1.535 | 56.000 | 2.001 |
| 4 | | −1.758 | (ASP) | 0.244 | | | | |
| 5 | Lens 2 | −0.995 | (ASP) | 0.245 | plastic | 1.634 | 23.900 | −3.446 |
| 6 | | −1.986 | (ASP) | 0.082 | | | | |
| 7 | Lens 3 | −1.526 | (ASP) | 0.530 | plastic | 1.535 | 56.000 | 2.270 |

TABLE 3-continued

Embodiment 2
f(focal length) = 1.989 mm, Fno = 2.0, FOV = 88 deg.

| surface | | Curvature Radius | Thickness | Material | index | Abbe # | Focal length |
|---|---|---|---|---|---|---|---|
| 8 | | −0.760 (ASP) | 0.030 | | | | |
| 9 | Lens 4 | 1.137 (ASP) | 0.474 | plastic | 1.634 | 23.900 | −4.598 |
| 10 | | 0.686 (ASP) | 0.796 | | | | |
| 11 | IR-filter | infinity | 0.210 | glass | 1.517 | 64.167 | — |
| 12 | | infinity | 0.061 | | | | |
| 13 | Image plane | infinity | infinity | | | | |

TABLE 4

| | Aspheric Coefficients | | | |
|---|---|---|---|---|
| surface | 3 | 4 | 5 | 6 |
| K: | −2.2925E+01 | 3.1307E+00 | −4.1132E−01 | 2.0620E+00 |
| A: | −3.0600E−03 | −4.4000E−01 | −8.8350E−01 | −4.5950E−02 |
| B: | −5.8881E−01 | 4.7018E−01 | 1.1033E+00 | 1.1127E−02 |
| C: | −1.2657E−01 | −3.1337E+00 | 2.5711E+00 | 1.7646E−02 |
| D: | −6.7867E+00 | 9.9512E+00 | −7.6703E+00 | −2.2910E−02 |
| E: | 3.6137E+01 | −1.5230E+01 | 9.3442E+00 | −1.3170E−02 |
| F: | −7.8194E+01 | 6.6926E+00 | −3.1733E+00 | 3.0368E−01 |
| surface | 7 | 8 | 9 | 10 |
| K: | −2.1297E+00 | −2.1956E+00 | −9.9468E−01 | −3.6855E+00 |
| A: | 1.0452E+00 | 5.7103E−02 | −4.9041E−01 | −1.9635E−01 |
| B: | −2.8541E+00 | −5.0640E−01 | 1.1823E−01 | 9.7398E−02 |
| C: | 4.9397E+00 | 1.8558E+00 | 1.6698E−01 | −3.9590E−02 |
| D: | −6.4412E+00 | −3.4158E+00 | −3.6301E−01 | 1.1060E−02 |
| E: | 5.4974E+00 | 3.1666E+00 | 3.0289E−01 | −2.9000E−03 |
| F: | −1.9679E+00 | −1.0665E+00 | −1.0536E−01 | 3.9500E−04 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f | 1.989 | f1/f23 | 0.5478 |
| Fno | 2.0 | f23/f4 | −0.7943 |
| FOV | 88 | f12/f34 | 1.3118 |
| f1/f2 | −0.5806 | f/TL | 0.6217 |
| f2/f3 | −1.5180 | CT2/CT1 | 0.4636 |
| f3/f4 | −0.4937 | T12/CT2 | 0.9972 |
| f1/f3 | 0.8813 | R2/R3 | 1.7672 |
| f2/f4 | 0.7495 | V1 − V2 | 32.1 |

Figure 3A:
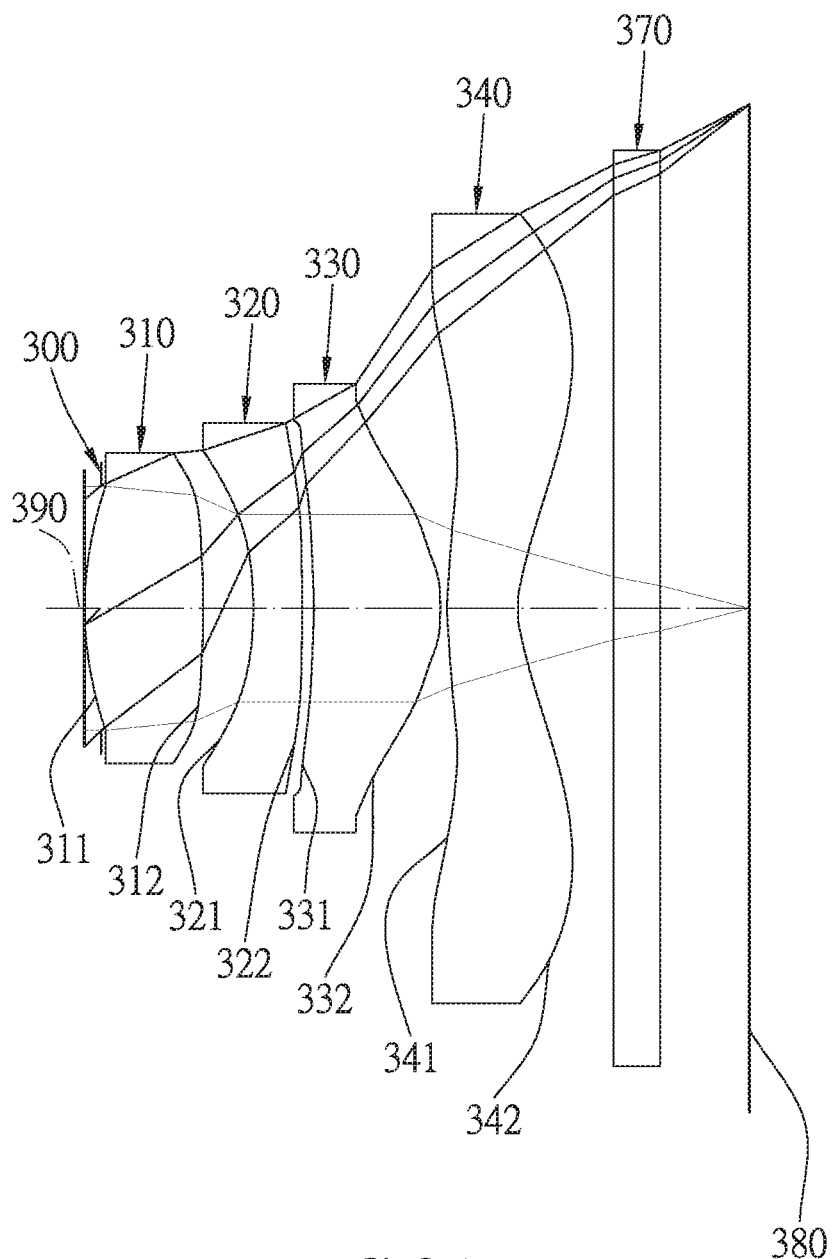
FIG. 3A shows an optical lens system with a wide field of view in accordance with a third embodiment of the present invention.
Figure 3B:
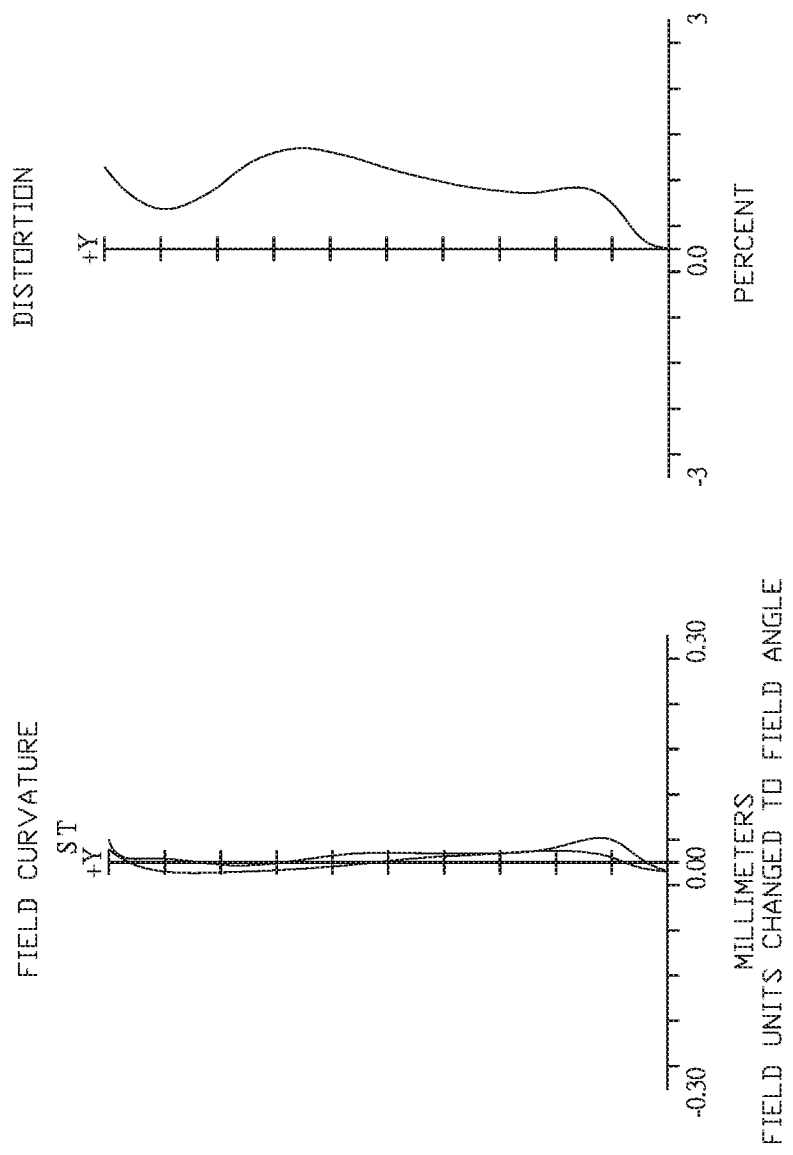
FIG. 3B shows the longitudinal spherical aberration curve, the astigmatic field curve and the distortion curve of the third embodiment of the present invention.

Referring to FIGS. 3A and 3B, FIG. 3A shows an optical lens system with a wide field of view in accordance with a third embodiment of the present invention, and FIG. 3B shows, in order from left to right, the longitudinal spherical aberration curves, the astigmatic field curves, and the distortion curve of the third embodiment of the present invention. An optical lens system with a wide field of view in accordance with the third embodiment of the present invention comprises a stop 300 and a lens group. The lens group comprises, in order from an object side to an image side: a first lens element 310, a second lens element 320, a third lens element 330, a fourth lens element 340, an IR cut filter 370 which is made of glass, and an image plane 380, wherein the optical lens system with a wide field of view has a total of four lens elements with refractive power. The stop 300 is disposed between an image-side surface 312 of the first lens element 310 and an object to be imaged.

The first lens element 310 with a positive refractive power has an object-side surface 311 being convex near an optical axis 390 and the image-side surface 312 being convex near the optical axis 390, the object-side surface 311 and the image-side surface 312 are aspheric, and the first lens element 310 is made of plastic material.

The second lens element 320 with a negative refractive power has an object-side surface 321 being concave near the optical axis 390 and an image-side surface 322 being convex near the optical axis 390, the object-side surface 321 and the image-side surface 322 are aspheric, and the second lens element 320 is made of plastic material.

The third lens element 330 with a positive refractive power has an object-side surface 331 being concave near the optical axis 390 and an image-side surface 332 being convex near the optical axis 390, the object-side surface 331 and the image-side surface 332 are aspheric, the third lens element 330 is made of plastic material.

The fourth lens element 340 with a negative refractive power has an object-side surface 341 being convex near the optical axis 390 and an image-side surface 342 being concave near the optical axis 390, the object-side surface 341 and the image-side surface 342 are aspheric, and the fourth lens element 340 is made of plastic material, and at least one of the object-side surface 341 and the image-side surface 342 is provided with at least one inflection point.

The IR cut filter 370 made of glass is located between the fourth lens element 340 and the image plane 380 and has no influence on the focal length of the optical lens system with a wide field of view.

TABLE 5

Embodiment 3
f(focal length) = 1.989 mm, Fno = 2.0, FOV = 87 deg.

| surface | | Curvature Radius | Thickness | Material | index | Abbe # | Focal length |
|---|---|---|---|---|---|---|---|
| 0 | object | infinity | infinity | | | | |
| 1 | | infinity | 0.065 | | | | |
| 2 | stop | infinity | −0.065 | | | | |
| 3 | Lens 1 | 1.286 (ASP) | 0.514 | plastic | 1.535 | 56.000 | 2.015 |
| 4 | | −5.877 (ASP) | 0.221 | | | | |
| 5 | Lens 2 | −1.394 (ASP) | 0.216 | plastic | 1.634 | 23.900 | −2.536 |
| 6 | | −10.449 (ASP) | 0.050 | | | | |
| 7 | Lens 3 | −2.825 (ASP) | 0.553 | plastic | 1.544 | 56.000 | 1.043 |
| 8 | | −0.507 (ASP) | 0.028 | | | | |
| 9 | Lens 4 | 1.490 (ASP) | 0.312 | plastic | 1.535 | 56.000 | −1.340 |
| 10 | | 0.450 (ASP) | 0.415 | | | | |
| 11 | IR-filter | infinity | 0.210 | glass | 1.517 | 64.167 | — |
| 12 | | infinity | 0.381 | | | | |
| 13 | Image plane | infinity | infinity | | | | |

TABLE 6

Aspheric Coefficients

| surface | 3 | 4 | 5 | 6 |
|---|---|---|---|---|
| K: | −1.3638E+00 | 3.3214E+01 | 6.5396E−01 | 2.0000E+02 |
| A: | −1.3240E−02 | −5.7987E−01 | −1.2123E+00 | −6.3547E−01 |
| B: | 4.7416E−02 | 3.8920E−01 | 4.8624E−01 | 1.6854E+00 |
| C: | −4.9746E+00 | −5.6766E+00 | 6.1081E+00 | −1.3519E+00 |
| D: | 2.3934E+01 | 1.4216E+01 | −9.3010E+00 | 1.8098E−01 |
| E: | −4.9983E+01 | −1.3355E+01 | 6.8476E+00 | 1.3561E−01 |
| F: | 0.0000E+00 | 0.0000E+00 | 0.0000E+00 | 0.0000E+00 |

| surface | 7 | 8 | 9 | 10 |
|---|---|---|---|---|
| K: | 1.3359E+01 | −2.5115E+00 | −8.0084E+01 | −5.7195E+00 |
| A: | 3.1843E−01 | 1.4102E−02 | 9.2864E−02 | −2.0165E−01 |
| B: | 3.0659E−01 | 4.8304E−02 | −7.2466E−01 | 1.2199E−01 |
| C: | −2.3347E+00 | −7.1600E−01 | 8.1429E−01 | −9.9110E−02 |
| D: | 4.7857E+00 | 1.8764E+00 | −3.5767E−01 | 5.6611E−02 |
| E: | −3.6810E+00 | −9.4558E−01 | 5.7214E−02 | −1.8500E−02 |
| F: | 0.0000E+00 | 0.0000E+00 | 0.0000E+00 | 2.5130E−03 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f | 1.989 | f1/f23 | 1.5988 |
| Fno | 2.0 | f23/f4 | −0.9404 |
| FOV | 87 | f12/f34 | 2.1036 |
| f1/f2 | −0.7944 | f/TL | 0.6860 |
| f2/f3 | −2.4322 | CT2/CT1 | 0.4204 |
| f3/f4 | −0.7782 | T12/CT2 | 1.0232 |

-continued

| Embodiment 3 | | | |
|---|---|---|---|
| f1/f3 | 1.9321 | R2/R3 | 4.2154 |
| f2/f4 | 1.8928 | V1 − V2 | 32.1 |

Figure 4A:
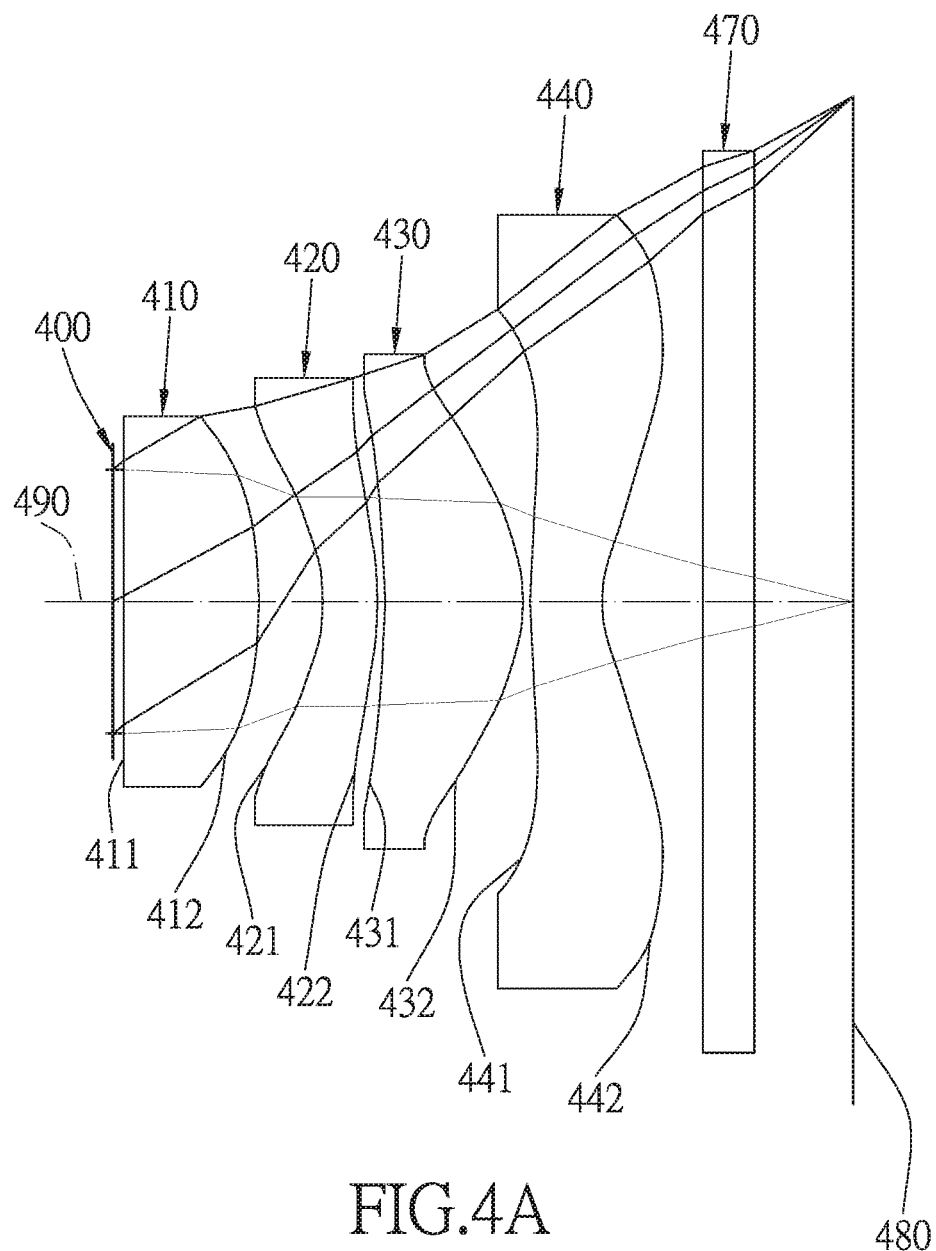
FIG. 4A shows an optical lens system with a wide field of view in accordance with a fourth embodiment of the present invention.
Figure 4B:
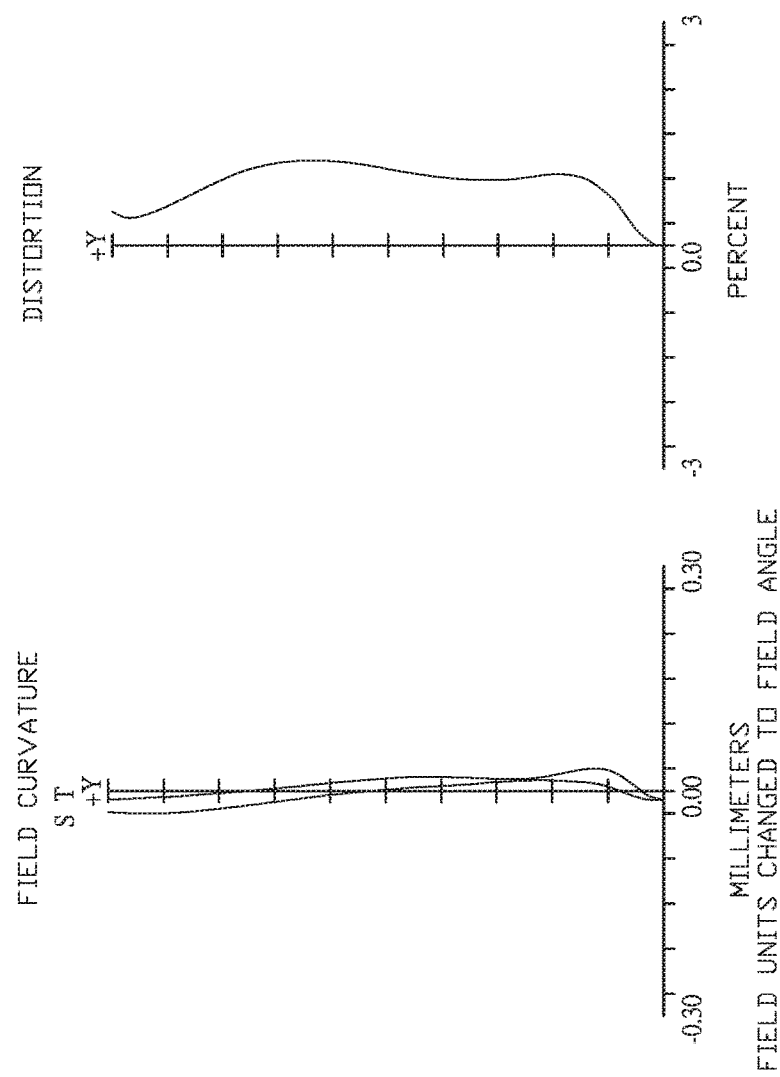
FIG. 4B shows the longitudinal spherical aberration curve, the astigmatic field curve and the distortion curve of the fourth embodiment of the present invention.

Referring to FIGS. 4A and 4B, FIG. 4A shows an optical lens system with a wide field of view in accordance with a fourth embodiment of the present invention, and FIG. 4B shows, in order from left to right, the longitudinal spherical aberration curves, the astigmatic field curves, and the distortion curve of the fourth embodiment of the present invention. An optical lens system with a wide field of view in accordance with the fourth embodiment of the present invention comprises a stop 400 and a lens group. The lens group comprises, in order from an object side to an image side: a first lens element 410, a second lens element 420, a third lens element 430, a fourth lens element 440, an IR cut filter 470 which is made of glass, and an image plane 480, wherein the optical lens system with a wide field of view has a total of four lens elements with refractive power. The stop 400 is disposed between an image-side surface 412 of the first lens element 410 and an object to be imaged.

The first lens element 410 with a positive refractive power has an object-side surface 411 being convex near an optical axis 490 and the image-side surface 412 being convex near the optical axis 490, the object-side surface 411 and the image-side surface 412 are aspheric, and the first lens element 410 is made of plastic material.

The second lens element 420 with a negative refractive power has an object-side surface 421 being concave near the optical axis 490 and an image-side surface 422 being convex near the optical axis 490, the object-side surface 421 and the image-side surface 422 are aspheric, and the second lens element 420 is made of plastic material.

The third lens element 430 with a positive refractive power has an object-side surface 431 being concave near the optical axis 490 and an image-side surface 432 being convex near the optical axis 490, the object-side surface 431 and the image-side surface 432 are aspheric, the third lens element 430 is made of plastic material.

The fourth lens element 440 with a negative refractive power has an object-side surface 441 being convex near the optical axis 490 and an image-side surface 442 being concave near the optical axis 490, the object-side surface 441 and the image-side surface 442 are aspheric, and the fourth lens element 440 is made of plastic material, and at least one of the object-side surface 441 and the image-side surface 442 is provided with at least one inflection point.

The IR cut filter 470 made of glass is located between the fourth lens element 440 and the image plane 480 and has no influence on the focal length of the optical lens system with a wide field of view.

TABLE 7

Embodiment 4
f(focal length) = 1.997 mm, Fno = 2.0, FOV = 84 deg.

| surface | | Curvature Radius | Thickness | Material | index | Abbe # | Focal length |
|---|---|---|---|---|---|---|---|
| 0 | object | infinity | infinity | | | | |
| 1 | | infinity | 0 | | | | |
| 2 | stop | infinity | 0 | | | | |
| 3 | Lens 1 | 1.888 (ASP) | 0.594 | plastic | 1.544 | 56.000 | 1.659 |
| 4 | | −1.549 (ASP) | 0.259 | | | | |
| 5 | Lens 2 | −0.647 (ASP) | 0.226 | plastic | 1.634 | 23.900 | −2.435 |
| 6 | | −1.256 (ASP) | 0.030 | | | | |
| 7 | Lens 3 | −3.226 (ASP) | 0.567 | plastic | 1.544 | 56.000 | 1.088 |
| 8 | | −0.533 (ASP) | 0.028 | | | | |
| 9 | Lens 4 | 1.911 (ASP) | 0.300 | plastic | 1.535 | 56.000 | −1.262 |
| 10 | | 0.473 (ASP) | 0.405 | | | | |
| 11 | IR-filter | infinity | 0.210 | glass | 1.517 | 64.167 | — |
| 12 | | infinity | 0.402 | | | | |
| 13 | Image plane | infinity | infinity | | | | |

TABLE 8

Aspheric coefficients

| surface | 3 | 4 | 5 | 6 |
|---|---|---|---|---|
| K: | −3.3383E+00 | 3.0263E+00 | −1.7821E+00 | −2.4069E+00 |
| A: | −1.4388E−01 | −3.1605E−01 | −1.7894E−01 | 4.6278E−01 |
| B: | −1.2716E−01 | −6.4560E−02 | 1.7896E−01 | −7.2142E−01 |
| C: | −2.9005E+00 | 1.5285E+00 | 8.4931E+00 | 2.5777E+00 |
| D: | 7.8056E+00 | −5.6547E+00 | −3.4980E+01 | −4.4221E+00 |
| E: | −8.4782E+00 | 8.8967E+00 | 5.8353E+01 | 1.8147E+00 |
| F: | −2.5473E+01 | −5.9186E+00 | −3.5383E+01 | 1.0531E+00 |

| surface | 7 | 8 | 9 | 10 |
|---|---|---|---|---|
| K: | 9.8876E+00 | −2.8350E+00 | −1.4003E+02 | −5.7255E+00 |
| A: | 2.5947E−01 | 1.8403E−01 | 1.9241E−01 | −1.6798E−01 |
| B: | −3.1865E−01 | −1.2572E+00 | −1.3327E+00 | 1.3981E−02 |
| C: | −2.4708E+00 | 3.1096E+00 | 2.2686E+00 | 6.7103E−02 |
| D: | 1.0012E+01 | −5.5690E+00 | −2.1912E+00 | −7.1610E−02 |
| E: | −1.4065E+01 | 6.3269E+00 | 1.2177E+00 | 3.0848E−02 |
| F: | 7.3561E+00 | −2.6318E+00 | −3.1494E−01 | −5.5500E−03 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f | 1.997 | f1/f23 | 1.3254 |
| Fno | 2.0 | f23/f4 | −0.9913 |
| FOV | 84 | f12/f34 | 1.1618 |
| f1/f2 | −0.6810 | f/TL | 0.6611 |
| f2/f3 | −2.2380 | CT2/CT1 | 0.3804 |
| f3/f4 | −0.8620 | T12/CT2 | 1.1446 |
| f1/f3 | 1.5242 | R2/R3 | 2.3943 |
| f2/f4 | 1.9292 | V1 − V2 | 32.1 |

Figure 5A:
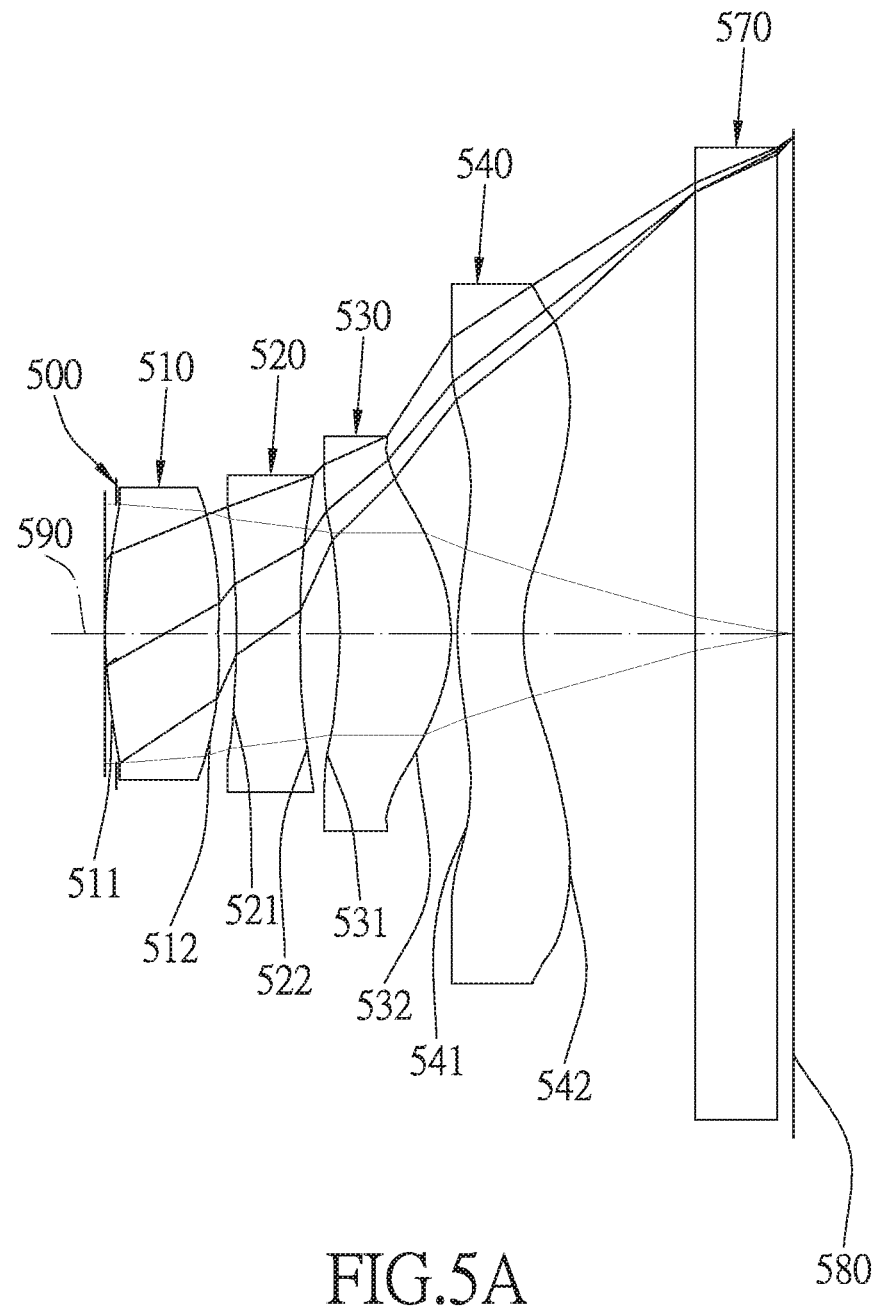
FIG. 5A shows an optical lens system with a wide field of view in accordance with a fifth embodiment of the present invention.
Figure 5B:
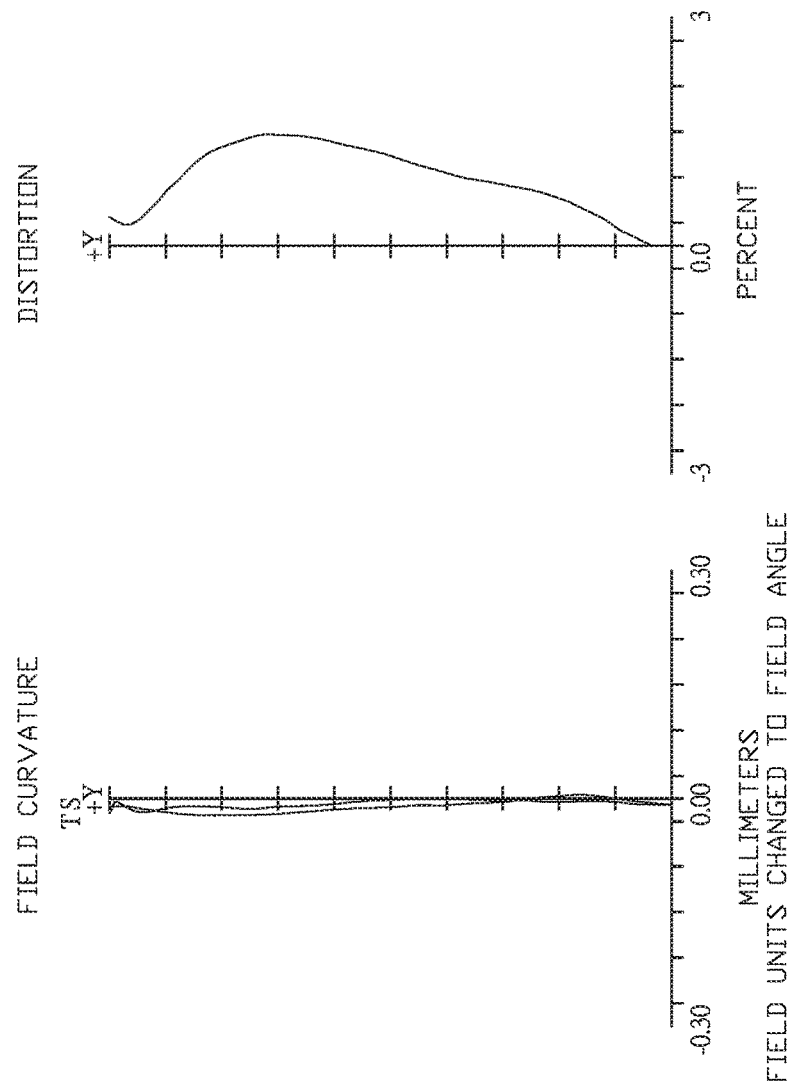
FIG. 5B shows the longitudinal spherical aberration curve, the astigmatic field curve and the distortion curve of the fifth embodiment of the present invention.

Referring to FIGS. 5A and 5B, FIG. 5A shows an optical lens system with a wide field of view in accordance with a fifth embodiment of the present invention, and FIG. 5B shows, in order from left to right, the longitudinal spherical aberration curves, the astigmatic field curves, and the distortion curve of the fifth embodiment of the present invention. An optical lens system with a wide field of view in accordance with the fifth embodiment of the present invention comprises a stop 500 and a lens group. The lens group comprises, in order from an object side to an image side: a first lens element 510, a second lens element 520, a third lens element 530, a fourth lens element 540, an IR cut filter 570 which is made of glass, and an image plane 580, wherein the optical lens system with a wide field of view has a total of four lens elements with refractive power. The stop 500 is disposed between an image-side surface 512 of the first lens element 510 and an object to be imaged.

The first lens element 510 with a positive refractive power has an object-side surface 511 being convex near an optical axis 590 and the image-side surface 512 being convex near the optical axis 590, the object-side surface 511 and the image-side surface 512 are aspheric, and the first lens element 510 is made of plastic material.

The second lens element 520 with a negative refractive power has an object-side surface 521 being concave near the optical axis 590 and an image-side surface 522 being concave near the optical axis 590, the object-side surface 521 and the image-side surface 522 are aspheric, and the second lens element 520 is made of plastic material.

The third lens element 530 with a positive refractive power has an object-side surface 531 being concave near the optical axis 590 and an image-side surface 532 being convex near the optical axis 590, the object-side surface 531 and the image-side surface 532 are aspheric, the third lens element 530 is made of plastic material.

The fourth lens element 540 with a negative refractive power has an object-side surface 541 being convex near the optical axis 590 and an image-side surface 542 being concave near the optical axis 590, the object-side surface 541 and the image-side surface 542 are aspheric, and the fourth lens element 540 is made of plastic material, and at least one of the object-side surface 541 and the image-side surface 542 is provided with at least one inflection point.

The IR cut filter 570 made of glass is located between the fourth lens element 540 and the image plane 580 and has no influence on the focal length of the optical lens system with a wide field of view.

TABLE 9

Embodiment 5
f(focal length) = 1.278 mm, Fno = 2.0, FOV = 83 deg.

| surface | | Curvature Radius | Thickness | Material | index | Abbe # | Focal length |
|---|---|---|---|---|---|---|---|
| 0 | object | infinity | infinity | | | | |
| 1 | | infinity | 0.028 | | | | |
| 2 | stop | infinity | −0.028 | | | | |
| 3 | Lens 1 | 0.946 (ASP) | 0.300 | plastic | 1.544 | 56.000 | 1.149 |
| 4 | | −1.658 (ASP) | 0.046 | | | | |
| 5 | Lens 2 | −4.611 (ASP) | 0.170 | plastic | 1.634 | 23.900 | −2.047 |
| 6 | | 1.883 (ASP) | 0.105 | | | | |
| 7 | Lens 3 | −0.937 (ASP) | 0.292 | plastic | 1.544 | 56.000 | 0.829 |
| 8 | | −0.339 (ASP) | 0.020 | | | | |
| 9 | Lens 4 | 0.809 (ASP) | 0.170 | plastic | 1.544 | 56.000 | −1.029 |
| 10 | | 0.307 (ASP) | 0.460 | | | | |
| 11 | IR-filter | infinity | 0.210 | glass | 1.517 | 64.167 | — |
| 12 | | infinity | 0.045 | | | | |
| 13 | Image plane | infinity | infinity | | | | |

TABLE 10

Aspheric coefficients

| surface | 3 | 4 | 5 | 6 |
|---|---|---|---|---|
| K: | −3.1006E+00 | −5.0371E+00 | −6.4859E+02 | 1.5981E+01 |
| A: | −3.3639E−01 | −1.6243E+00 | −2.1517E+00 | 2.0951E−01 |

TABLE 10-continued

| Aspheric coefficients | | | | |
|---|---|---|---|---|
| B: | 1.2822E+01 | −7.1668E+00 | −2.5841E+00 | −1.9888E+01 |
| C: | −5.0103E+02 | 8.0763E+01 | 1.3858E+02 | 2.7874E+02 |
| D: | 7.5740E+03 | 2.3102E+01 | −1.2824E+03 | −2.5059E+03 |
| E: | −5.8637E+04 | −6.2883E+03 | 6.3984E+03 | 1.1804E+04 |
| F: | 1.7412E+05 | 3.1344E+04 | −8.1839E+03 | −2.2000E+04 |

| Surface | 7 | 8 | 9 | 10 |
|---|---|---|---|---|
| K: | 1.2670E−01 | −5.0748E+00 | −4.4007E+00 | −4.7054E+00 |
| A: | 3.1277E+00 | −4.4952E+00 | −2.8762E+00 | −1.9584E+00 |
| B: | −4.2017E+01 | 5.1336E+01 | −2.1357E+00 | 5.8741E+00 |
| C: | 4.7364E+02 | −6.2107E+02 | 9.7491E+01 | −1.1064E+01 |
| D: | −2.8125E+03 | 5.7130E+03 | −5.4995E+02 | 3.5912E+00 |
| E: | 1.0734E+04 | −3.1403E+04 | 1.4798E+03 | 2.4618E+01 |
| F: | −2.0650E+04 | 9.9514E+04 | −1.9389E+03 | −4.5361E+01 |
| G: | 7.0938E+03 | −1.3477E+05 | 9.9149E+02 | 2.5929E+01 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f | 1.278 | f1/f23 | 1.0870 |
| Fno | 2.0 | f23/f4 | −1.0273 |
| FOV | 83 | f12/f34 | 0.7959 |
| f1/f2 | −0.5615 | f/TL | 0.7030 |
| f2/f3 | −2.4695 | CT2/CT1 | 0.5666 |
| f3/f4 | −0.8054 | T12/CT2 | 0.2694 |
| f1/f3 | 1.3865 | R2/R3 | 0.3595 |
| f2/f4 | 1.9888 | V1 − V2 | 32.1 |

Figure 6A:
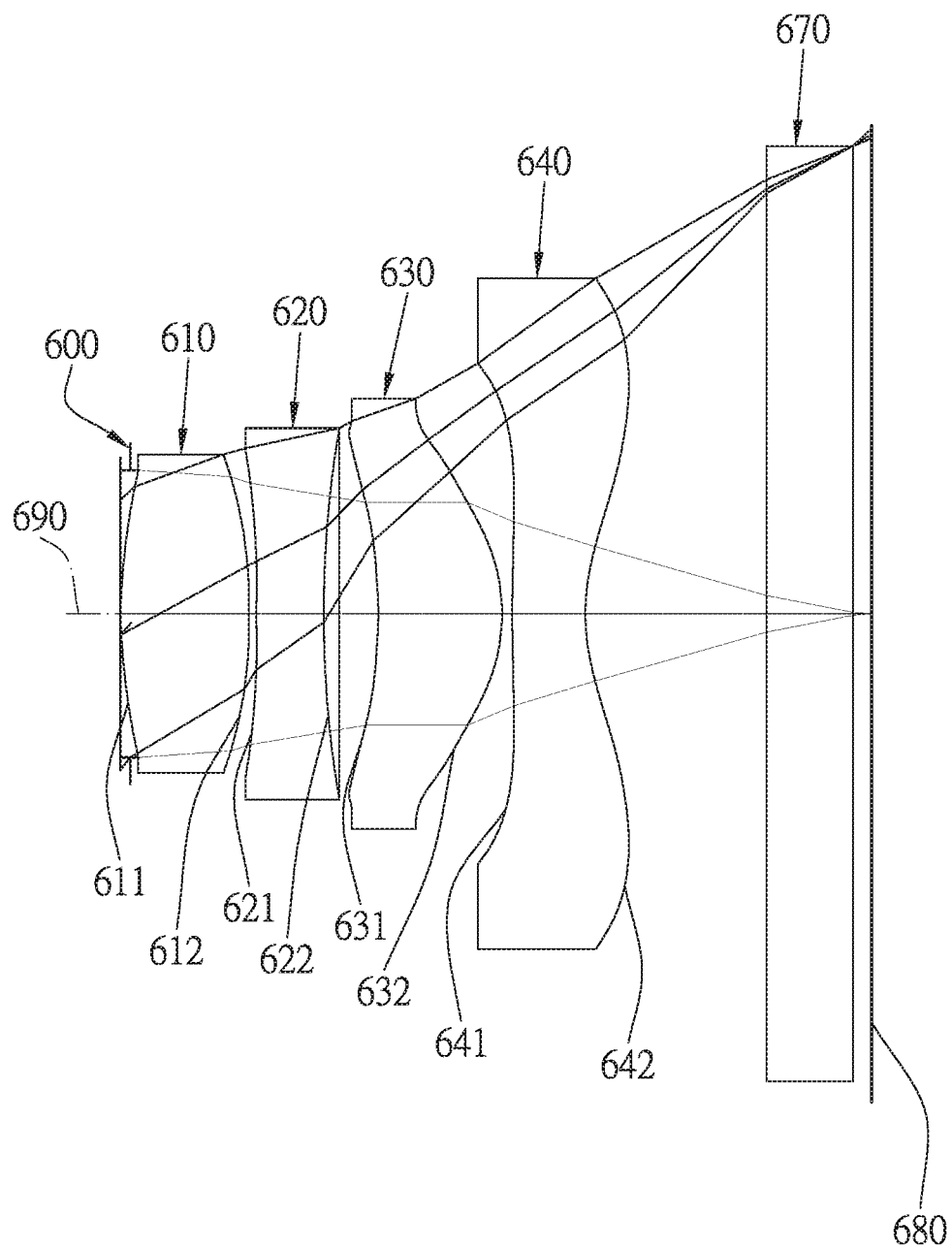
FIG. 6A shows an optical lens system with a wide field of view in accordance with a sixth embodiment of the present invention.
Figure 6B:
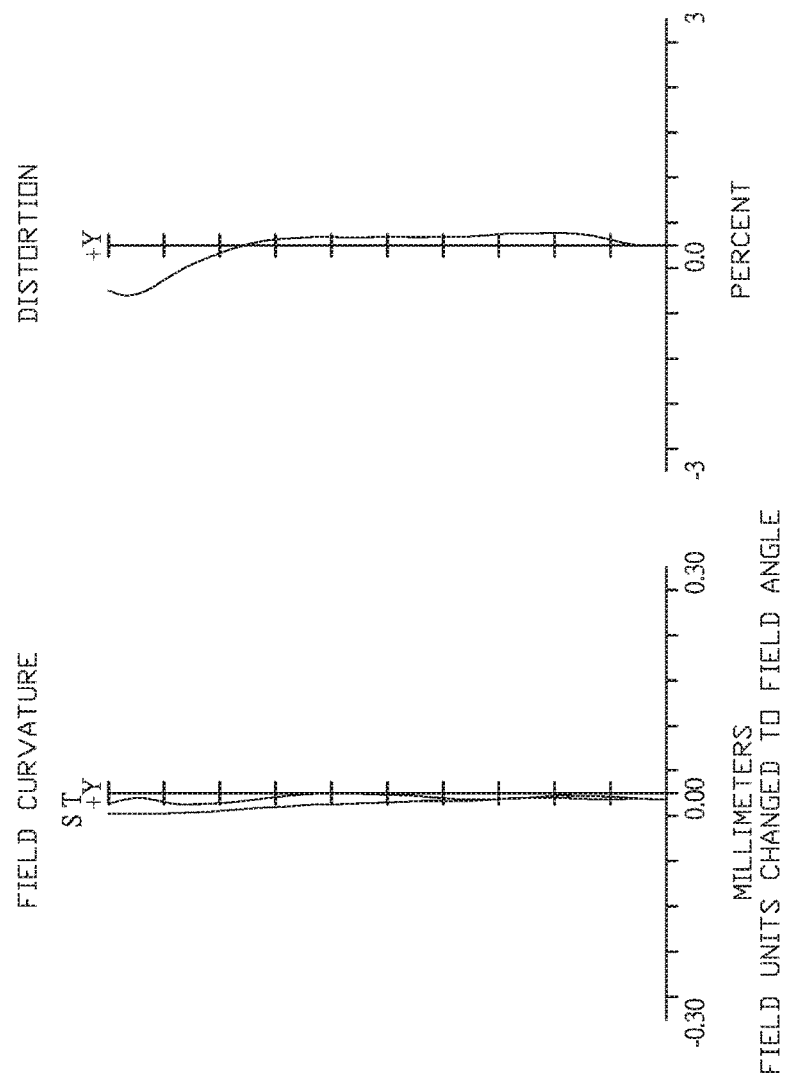
FIG. 6B shows the longitudinal spherical aberration curve, the astigmatic field curve and the distortion curve of the sixth embodiment of the present invention.

Referring to FIGS. 6A and 6B, FIG. 6A shows an optical lens system with a wide field of view in accordance with a sixth embodiment of the present invention, and FIG. 6B shows, in order from left to right, the longitudinal spherical aberration curves, the astigmatic field curves, and the distortion curve of the sixth embodiment of the present invention. An optical lens system with a wide field of view in accordance with the sixth embodiment of the present invention comprises a stop 600 and a lens group. The lens group comprises, in order from an object side to an image side: a first lens element 610, a second lens element 620, a third lens element 630, a fourth lens element 640, an IR cut filter 670 which is made of glass, and an image plane 680, wherein the optical lens system with a wide field of view has a total of four lens elements with refractive power. The stop 600 is disposed between an image-side surface 612 of the first lens element 610 and an object to be imaged.

The first lens element 610 with a positive refractive power has an object-side surface 611 being convex near an optical axis 690 and the image-side surface 612 being convex near the optical axis 690, the object-side surface 611 and the image-side surface 612 are aspheric, and the first lens element 610 is made of plastic material.

The second lens element 620 with a negative refractive power has an object-side surface 621 being concave near the optical axis 690 and an image-side surface 622 being concave near the optical axis 690, the object-side surface 621 and the image-side surface 622 are aspheric, and the second lens element 620 is made of plastic material.

The third lens element 630 with a positive refractive power has an object-side surface 631 being concave near the optical axis 690 and an image-side surface 632 being convex near the optical axis 690, the object-side surface 631 and the image-side surface 632 are aspheric, the third lens element 630 is made of plastic material.

The fourth lens element 640 with a negative refractive power has an object-side surface 641 being convex near the optical axis 690 and an image-side surface 642 being concave near the optical axis 690, the object-side surface 641 and the image-side surface 642 are aspheric, and the fourth lens element 640 is made of plastic material, and at least one of the object-side surface 641 and the image-side surface 642 is provided with at least one inflection point.

The IR cut filter 670 made of glass is located between the fourth lens element 640 and the image plane 680 and has no influence on the focal length of the optical lens system with a wide field of view.

TABLE 11

Embodiment 6
f(focal length) = 1.289 mm, Fno = 2.0, FOV = 77 deg.

| surface | | Curvature Radius | Thickness | Material | index | Abbe # | Focal length |
|---|---|---|---|---|---|---|---|
| 0 | object | infinity | 500.000 | | | | |
| 1 | | infinity | 0.028 | | | | |
| 2 | stop | infinity | −0.028 | | | | |
| 3 | Lens 1 | 0.944 (ASP) | 0.313 | plastic | 1.544 | 56.000 | 1.159 |
| 4 | | −1.682 (ASP) | 0.016 | | | | |
| 5 | Lens 2 | −75.849 (ASP) | 0.166 | plastic | 1.651 | 21.500 | −2.810 |

TABLE 11-continued

Embodiment 6
f(focal length) = 1.289 mm, Fno = 2.0, FOV = 77 deg.

| surface | | Curvature Radius | Thickness | Material | index | Abbe # | Focal length |
|---|---|---|---|---|---|---|---|
| 6 | | 1.888 (ASP) | 0.132 | | | | |
| 7 | Lens 3 | −0.745 (ASP) | 0.300 | plastic | 1.544 | 56.000 | 0.697 |
| 8 | | −0.287 (ASP) | 0.020 | | | | |
| 9 | Lens 4 | 1.347 (ASP) | 0.179 | plastic | 1.544 | 56.000 | −0.738 |
| 10 | | 0.295 (ASP) | 0.439 | | | | |
| 11 | IR-filter | infinity | 0.210 | glass | 1.517 | 64.167 | — |
| 12 | | infinity | 0.045 | | | | |
| 13 | Image plane | infinity | infinity | | | | |

TABLE 12

Aspheric coefficients

| surface | 3 | 4 | 5 | 6 |
|---|---|---|---|---|
| K: | −3.2436E+00 | 1.0075E+01 | 6.0062E+02 | 1.9904E+01 |
| A: | −4.1863E−01 | −2.4726E+00 | −2.3134E+00 | 3.6054E−01 |
| B: | 1.4320E+01 | −3.3555E+00 | −1.0129E+01 | −2.2910E+01 |
| C: | −4.8139E+02 | 1.3925E+02 | 2.0009E+02 | 2.5614E+02 |
| D: | 7.4692E+03 | 3.1584E+01 | −7.5161E+02 | −2.4751E+03 |
| E: | −6.3998E+04 | −8.0557E+03 | 9.5372E+02 | 1.2531E+04 |
| F: | 2.1861E+05 | 3.7658E+04 | 6.8744E+03 | −2.4005E+04 |

| surface | 7 | 8 | 9 | 10 |
|---|---|---|---|---|
| K: | 3.7899E−01 | −4.2104E+00 | −4.0403E−01 | −5.6576E+00 |
| A: | 2.8776E+00 | −4.9116E+00 | −3.1508E+00 | −2.1777E+00 |
| B: | −3.4366E+01 | 5.3532E+01 | −3.6883E+00 | 6.8000E+00 |
| C: | 4.3152E+02 | −6.3024E+02 | 1.0368E+02 | −1.3454E+01 |
| D: | −3.0337E+03 | 5.7033E+03 | −5.6084E+02 | 5.2001E+00 |
| E: | 1.0914E+04 | −3.1555E+04 | 1.4795E+03 | 2.7037E+01 |
| F: | −9.6397E+03 | 9.8434E+04 | −2.3193E+03 | −5.0027E+01 |
| G: | −1.0291E+04 | −1.2606E+05 | 2.0371E+03 | 2.7466E+01 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f | 1.289 | f1/f23 | 1.4819 |
| Fno | 2.0 | f23/f4 | −1.0597 |
| FOV | 77 | f12/f34 | 0.4006 |
| f1/f2 | −0.4126 | f/TL | 0.7080 |
| f2/f3 | −4.0302 | CT2/CT1 | 0.5288 |
| f3/f4 | −0.9443 | T12/CT2 | 0.0974 |
| f1/f3 | 1.6628 | R2/R3 | 0.0222 |
| f2/f4 | 3.8059 | V1 − V2 | 34.5 |

Figure 7A:
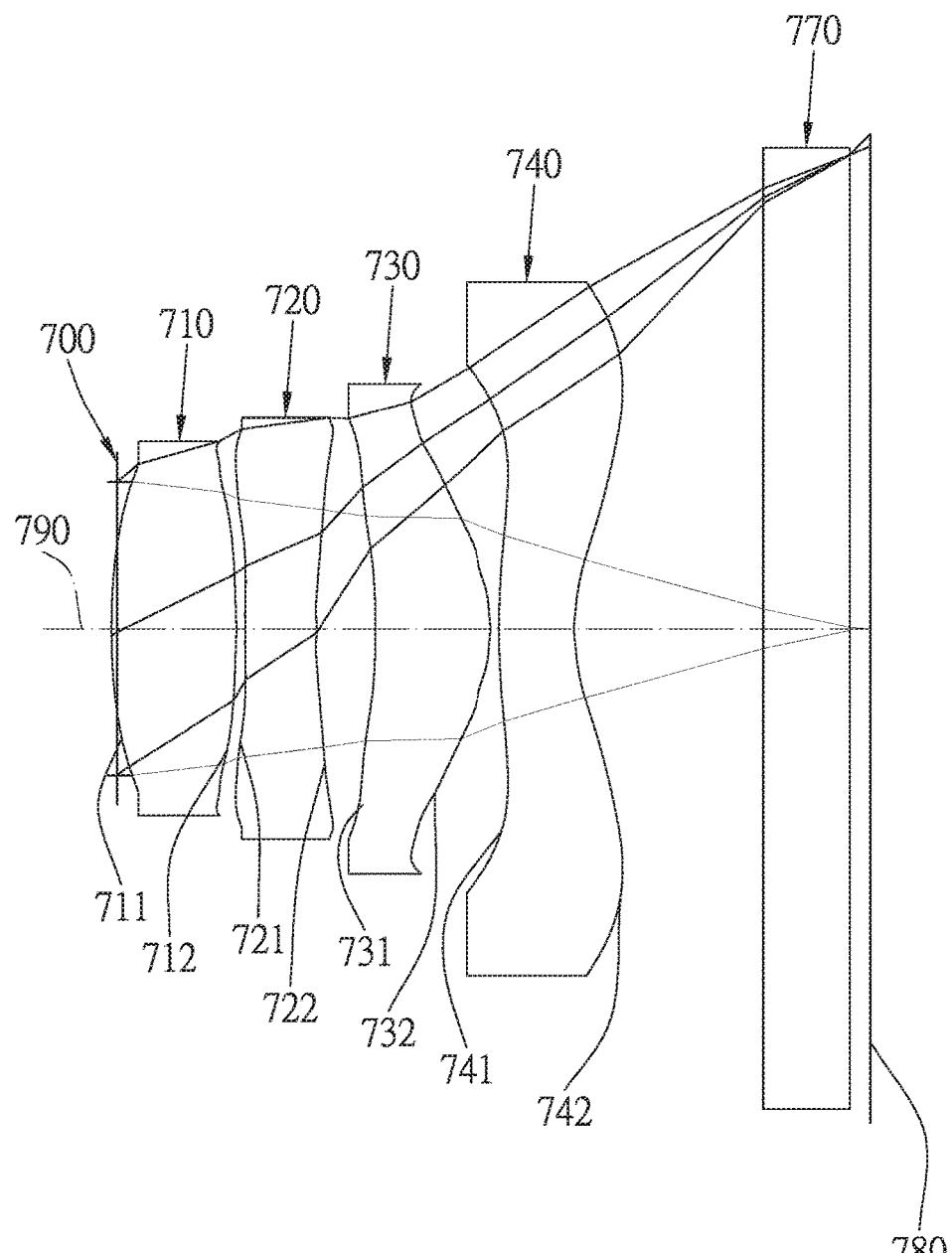
FIG. 7A shows an optical lens system with a wide field of view in accordance with a seventh embodiment of the present invention.
Figure 7B:
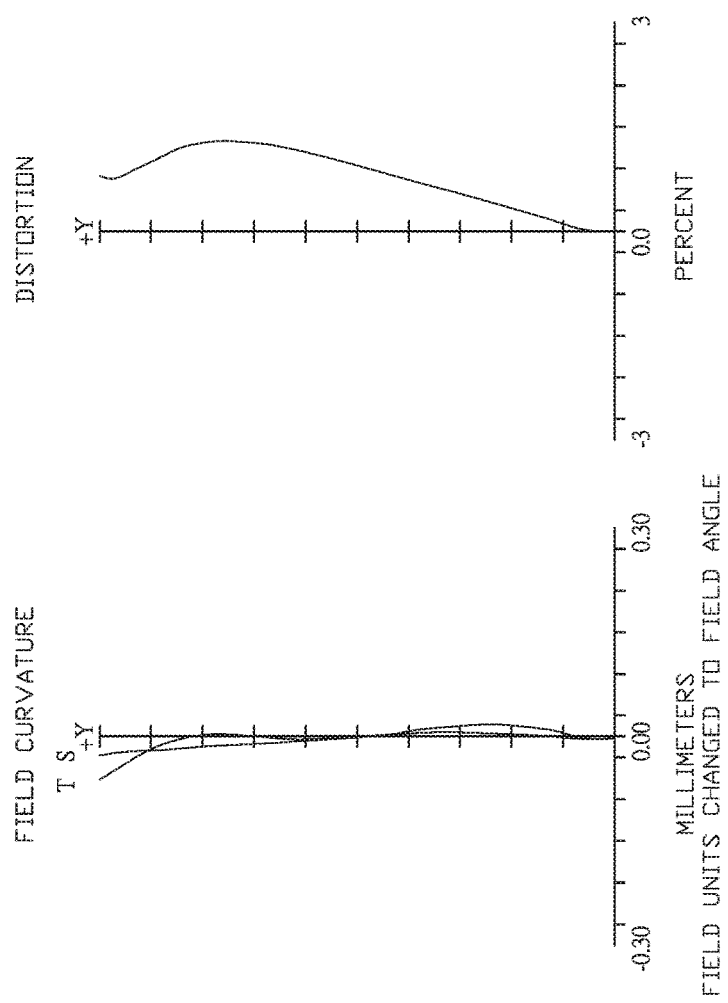
FIG. 7B shows the longitudinal spherical aberration curve, the astigmatic field curve and the distortion curve of the seventh embodiment of the present invention.

Referring to FIGS. 7A and 7B, FIG. 7A shows an optical lens system with a wide field of view in accordance with a seventh embodiment of the present invention, and FIG. 7B shows, in order from left to right, the longitudinal spherical aberration curves, the astigmatic field curves, and the distortion curve of the seventh embodiment of the present invention. An optical lens system with a wide field of view in accordance with the seventh embodiment of the present invention comprises a stop 700 and a lens group. The lens group comprises, in order from an object side to an image side: a first lens element 710, a second lens element 720, a third lens element 730, a fourth lens element 740, an IR cut filter 770 which is made of glass, and an image plane 780, wherein the optical lens system with a wide field of view has a total of four lens elements with refractive power. The stop 700 is disposed between an image-side surface 712 of the first lens element 710 and an object to be imaged.

The first lens element 710 with a positive refractive power has an object-side surface 711 being convex near an optical axis 790 and the image-side surface 712 being convex near the optical axis 790, the object-side surface 711 and the image-side surface 712 are aspheric, and the first lens element 710 is made of plastic material.

The second lens element 720 with a negative refractive power has an object-side surface 721 being concave near the optical axis 790 and an image-side surface 722 being concave near the optical axis 790, the object-side surface 721 and the image-side surface 722 are aspheric, and the second lens element 720 is made of plastic material.

The third lens element 730 with a positive refractive power has an object-side surface 731 being concave near the optical axis 790 and an image-side surface 732 being convex near the optical axis 790, the object-side surface 731 and the image-side surface 732 are aspheric, the third lens element 730 is made of plastic material.

The fourth lens element 740 with a negative refractive power has an object-side surface 741 being convex near the optical axis 790 and an image-side surface 742 being concave near the optical axis 790, the object-side surface 741 and the image-side surface 742 are aspheric, and the fourth lens element 740 is made of plastic material, and at least one of the object-side surface 741 and the image-side surface 742 is provided with at least one inflection point.

The IR cut filter 770 made of glass is located between the fourth lens element 740 and the image plane 780 and has no influence on the focal length of the optical lens system with a wide field of view.

TABLE 13

Embodiment 7
f(focal length) = 1.289 mm, Fno = 2.0, FOV = 77 deg.

| surface | | Curvature Radius | Thickness | Material | index | Abbe # | Focal length |
|---|---|---|---|---|---|---|---|
| 0 | object | infinity | 500.000 | | | | |
| 1 | | infinity | 0.028 | | | | |
| 2 | stop | infinity | −0.028 | | | | |
| 3 | Lens 1 | 0.944 (ASP) | 0.313 | plastic | 1.544 | 56.000 | 1.159 |
| 4 | | −1.682 (ASP) | 0.016 | | | | |
| 5 | Lens 2 | −75.849 (ASP) | 0.166 | plastic | 1.651 | 21.500 | −2.810 |
| 6 | | 1.888 (ASP) | 0.132 | | | | |
| 7 | Lens 3 | −0.745 (ASP) | 0.300 | plastic | 1.544 | 56.000 | 0.697 |
| 8 | | −0.287 (ASP) | 0.020 | | | | |
| 9 | Lens 4 | 1.347 (ASP) | 0.179 | plastic | 1.544 | 56.000 | −0.738 |
| 10 | | 0.295 (ASP) | 0.439 | | | | |
| 11 | IR-filter | infinity | 0.210 | glass | 1.517 | 64.167 | — |
| 12 | | infinity | 0.045 | | | | |
| 13 | Image plane | infinity | infinity | | | | |

TABLE 14

Aspheric coefficients

| surface | 3 | 4 | 5 | 6 |
|---|---|---|---|---|
| K: | −3.2436E+00 | 1.0075E+01 | 6.0062E+02 | 1.9904E+01 |
| A: | −4.1863E−01 | −2.4726E+00 | −2.3134E+00 | 3.6054E−01 |
| B: | 1.4320E+01 | −3.3555E+00 | −1.0129E+01 | −2.2910E+01 |
| C: | −4.8139E+02 | 1.3925E+02 | 2.0009E+02 | 2.5614E+02 |
| D: | 7.4692E+03 | 3.1584E+01 | −7.5161E+02 | −2.4751E+03 |
| E: | −6.3998E+04 | −8.0557E+03 | 9.5372E+02 | 1.2531E+04 |
| F: | 2.1861E+05 | 3.7658E+04 | 6.8744E+03 | −2.4005E+04 |

| surface | 7 | 8 | 9 | 10 |
|---|---|---|---|---|
| K: | 3.7899E−01 | −4.2104E+00 | −4.0403E−01 | −5.6576E+00 |
| A: | 2.8776E+00 | −4.9116E+00 | −3.1508E+00 | −2.1777E+00 |
| B: | −3.4366E+01 | 5.3532E+01 | −3.6883E+00 | 6.8000E+00 |
| C: | 4.3152E+02 | −6.3024E+02 | 1.0368E+02 | −1.3454E+01 |
| D: | −3.0337E+03 | 5.7033E+03 | −5.6084E+02 | 5.2001E+00 |
| E: | 1.0914E+04 | −3.1555E+04 | 1.4795E+03 | 2.7037E+01 |
| F: | −9.6397E+03 | 9.8434E+04 | −2.3193E+03 | −5.0027E+01 |
| G: | −1.0291E+04 | −1.2606E+05 | 2.0371E+03 | 2.7466E+01 |

Embodiment 7

| f | 1.315 | f1/f23 | 1.2156 |
|---|---|---|---|
| Fno | 2.0 | f23/f4 | −1.0729 |
| FOV | 75 | f12/f34 | 0.6041 |
| f1/f2 | −0.5088 | f/TL | 0.7235 |
| f2/f3 | −2.8734 | CT2/CT1 | 0.5606 |
| f3/f4 | −0.8921 | T12/CT2 | 0.1256 |
| f1/f3 | 1.4620 | R2/R3 | 0.4546 |
| f2/f4 | 2.5634 | V1 − V2 | 32.1 |

In the seventh embodiment, the equation of the aspheric surface profiles of the aforementioned lens elements is the same as the equation of the first embodiment. Also, the definitions of these parameters shown in the following table are the same as those stated in the first embodiment with corresponding values for the seventh embodiment, so an explanation in this regard will not be provided again.

Figure 8A:
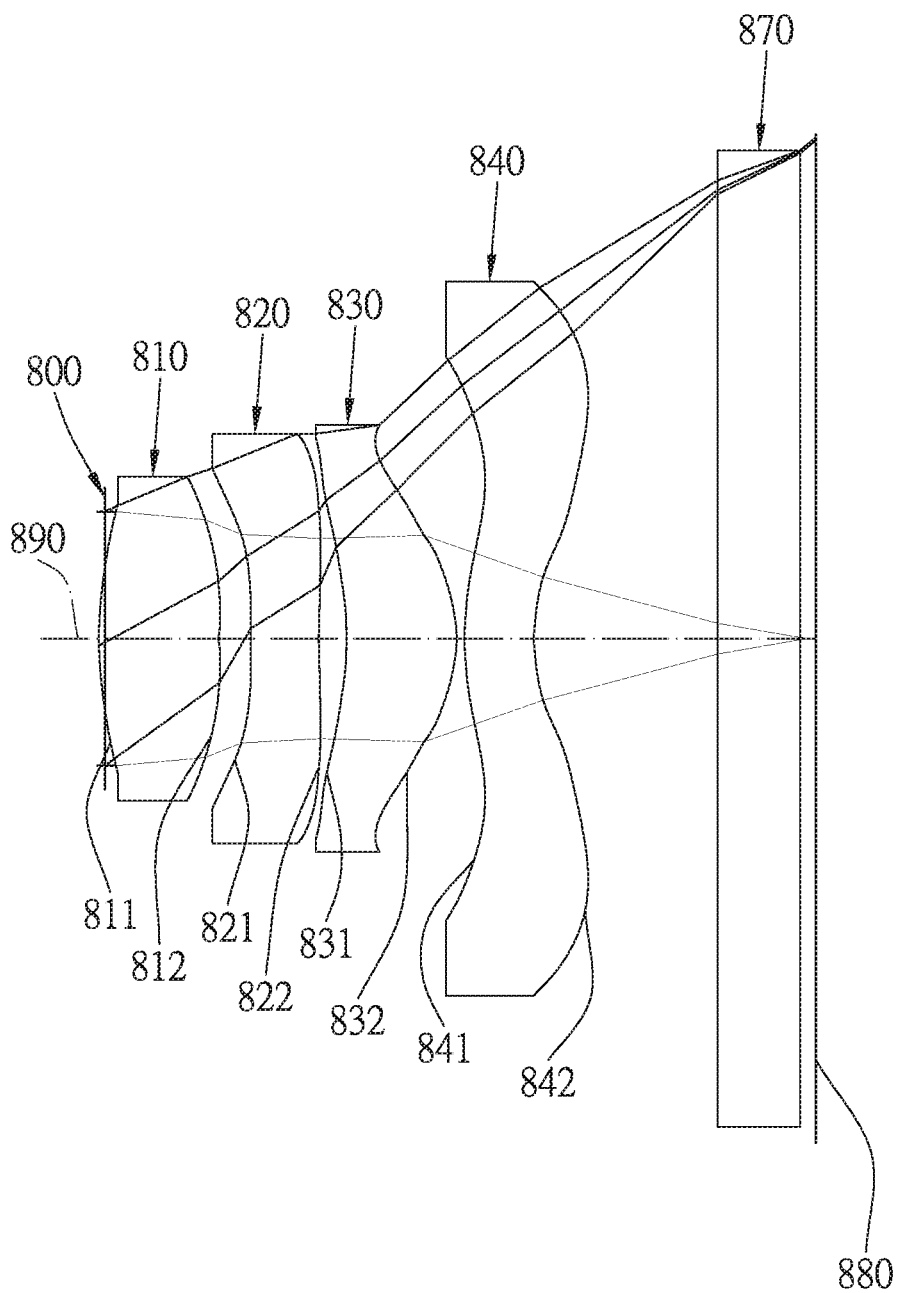
FIG. 8A shows an optical lens system with a wide field of view in accordance with an eighth embodiment of the present invention.
Figure 8B:
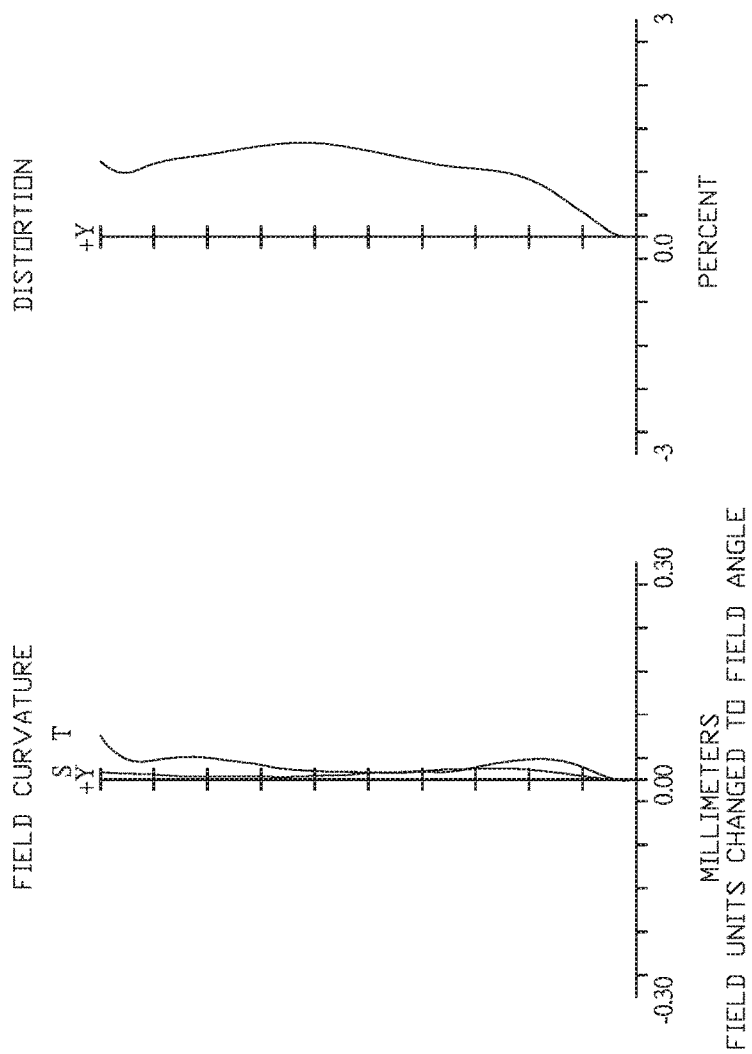
FIG. 8B shows the longitudinal spherical aberration curve, the astigmatic field curve and the distortion curve of the eighth embodiment of the present invention.

Moreover, these parameters can be calculated from Table 13 and Table 14 as the following values and satisfy the following conditions:

Referring to FIGS. 8A and 8B, FIG. 8A shows an optical lens system with a wide field of view in accordance with a eighth embodiment of the present invention, and FIG. 8B shows, in order from left to right, the longitudinal spherical aberration curves, the astigmatic field curves, and the distortion curve of the eighth embodiment of the present invention. An optical lens system with a wide field of view in accordance with the eighth embodiment of the present invention comprises a stop 800 and a lens group. The lens group comprises, in order from an object side to an image side: a first lens element 810, a second lens element 820, a third lens element 830, a fourth lens element 840, an IR cut filter 880 which is made of glass, and an image plane 880, wherein the optical lens system with a wide field of view has a total of four lens elements with refractive power. The stop 800 is disposed between an image-side surface 812 of the first lens element 810 and an object to be imaged.

The first lens element 810 with a positive refractive power has an object-side surface 811 being convex near an optical axis 890 and the image-side surface 812 being convex near the optical axis 890, the object-side surface 811 and the image-side surface 812 are aspheric, and the first lens element 810 is made of plastic material.

The second lens element 820 with a negative refractive power has an object-side surface 821 being concave near the optical axis 890 and an image-side surface 822 being concave near the optical axis 890, the object-side surface 821 and the image-side surface 822 are aspheric, and the second lens element 820 is made of plastic material.

The third lens element 830 with a positive refractive power has an object-side surface 831 being concave near the optical axis 890 and an image-side surface 832 being convex near the optical axis 890, the object-side surface 831 and the image-side surface 832 are aspheric, the third lens element 830 is made of plastic material.

The fourth lens element 840 with a negative refractive power has an object-side surface 841 being convex near the optical axis 890 and an image-side surface 842 being concave near the optical axis 890, the object-side surface 841 and the image-side surface 842 are aspheric, and the fourth lens element 840 is made of plastic material, and at least one of the object-side surface 841 and the image-side surface 842 is provided with at least one inflection point.

The IR cut filter 880 made of glass is located between the fourth lens element 840 and the image plane 880 and has no influence on the focal length of the optical lens system with a wide field of view.

TABLE 15

Embodiment 8
f(focal length) = 1.241 mm, Fno = 2.0, FOV = 85 deg.

| surface | | Curvature Radius | Thickness | Material | index | Abbe # | Focal length |
|---|---|---|---|---|---|---|---|
| 0 | stop | infinity | infinity | | | | |
| 1 | Lens 1 | infinity | 0.000 | | | | |
| 2 | | infinity | −0.015 | | | | |
| 3 | Lens 2 | 0.938 (ASP) | 0.305 | plastic | 1.544 | 56.000 | 1.413 |
| 4 | | −3.858 (ASP) | 0.085 | | | | |
| 5 | Lens 3 | −4.954 (ASP) | 0.171 | plastic | 1.634 | 23.900 | −3.051 |
| 6 | | 3.322 (ASP) | 0.074 | | | | |
| 7 | Lens 4 | −0.684 (ASP) | 0.284 | plastic | 1.544 | 56.000 | 0.825 |
| 8 | | −0.311 (ASP) | 0.020 | | | | |
| 9 | IR-filter | 0.627 (ASP) | 0.174 | plastic | 1.544 | 56.000 | −1.130 |
| 10 | | 0.281 (ASP) | 0.475 | | | | |
| 11 | Image plane | infinity | 0.210 | glass | 1.517 | 64.167 | — |
| 12 | stop | infinity | 0.039 | | | | |
| 13 | Lens 1 | infinity | infinity | | | | |

TABLE 16

Aspheric coefficients

| surface | 3 | 4 | 5 | 6 |
|---|---|---|---|---|
| K: | −1.0303E+00 | 6.0270E+01 | −3.9167E+02 | −4.0480E+01 |
| A: | −1.7002E−01 | −3.0279E+00 | −4.9669E+00 | 7.5990E−03 |
| B: | −6.2803E+00 | −5.2750E+00 | −2.3609E+01 | −2.2509E+01 |
| C: | 4.2379E+01 | 4.2734E+01 | 2.2779E+02 | 1.5333E+02 |
| D: | −6.7652E+02 | −1.2562E+02 | 3.2808E+02 | −4.2346E+02 |
| E: | −4.8084E+02 | 4.6255E+02 | −2.5025E+03 | 2.6406E+02 |
| F: | 3.2611E+04 | 7.0810E+03 | −2.2643E+03 | −1.2368E+02 |

| surface | 7 | 8 | 9 | 10 |
|---|---|---|---|---|
| K: | 7.2172E−01 | −4.1480E+00 | −3.7501E+00 | −4.7450E+00 |
| A: | 4.9760E+00 | −4.2487E+00 | −3.4976E+00 | −1.2474E+00 |
| B: | −7.0244E+00 | 2.3341E+01 | 1.7168E+01 | 1.5462E+00 |
| C: | −3.6053E+02 | 3.6085E+01 | −1.0249E+02 | −1.2293E+00 |
| D: | 4.2850E+03 | −1.7910E+03 | 4.2953E+02 | 1.0565E+00 |
| E: | −2.0253E+04 | 1.2769E+04 | −1.0611E+03 | −3.6925E+00 |
| F: | 4.5750E+04 | −3.3601E+04 | 1.3610E+03 | 4.7684E+00 |
| G: | −4.1313E+04 | 2.9112E+04 | −6.7854E+02 | −2.1397E+00 |

In the eighth embodiment, the equation of the aspheric surface profiles of the aforementioned lens elements is the same as the equation of the first embodiment. Also, the definitions of these parameters shown in the following table are the same as those stated in the first embodiment with corresponding values for the eighth embodiment, so an explanation in this regard will not be provided again.

Moreover, these parameters can be calculated from Table 13 and Table 14 as the following values and satisfy the following conditions:

| Embodiment 8 | | | |
|---|---|---|---|
| f | 1.241 | f1/f23 | 1.4639 |
| Fno | 2.0 | f23/f4 | −0.8542 |
| FOV | 85 | f12/f34 | 1.0737 |
| f1/f2 | −0.4631 | f/TL | 0.6759 |
| f2/f3 | −3.6998 | CT2/CT1 | 0.5602 |
| f3/f4 | −0.7298 | T12/CT2 | 0.4974 |
| f1/f3 | 1.7133 | R2/R3 | 0.7789 |
| f2/f4 | 2.7002 | V1 − V2 | 32.1 |

In the present optical lens system, the lens elements can be made of plastic or glass. If the lens elements are made of plastic, the cost will be effectively reduced. If the lens elements are made of glass, there is more freedom in distributing the refractive power of the optical lens system. Plastic lens elements can have aspheric surfaces, which allow more design parameter freedom (than spherical surfaces), so as to reduce the aberration and the number of the lens elements, as well as the total track length of the optical lens system.

In the present optical lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The optical lens system of the present invention can be used in focusing optical systems and can obtain better image quality. The optical lens system of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens system with a wide field of view, in order from an object side to an image side, comprising:
   a stop;
   a first lens element with a positive refractive power, having an object-side surface being convex near an optical axis and an image-side surface being convex near the optical axis, at least one of the object-side surface and the image-side surface of the first lens element being aspheric;
   a second lens element with a negative refractive power, having an object-side surface being concave near the optical axis, at least one of the object-side surface and an image-side surface of the second lens element being aspheric;
   a third lens element with a positive refractive power, having an image-side surface being convex near the optical axis, at least one of an object-side surface and the image-side surface of the third lens element being aspheric; and
   a fourth lens element with a negative refractive power, having an object-side surface being convex near the optical axis, at least one of the object-side surface and an image-side surface of the fourth lens element being aspheric and provided with at least one inflection point;
   wherein a focal length of the first lens element is f1, a focal length of the second lens element and the third lens element combined is f23, a radius of curvature of the image-side surface of the first lens element is R2, a radius of curvature of the object-side surface of the second lens element is R3, and they satisfy the relations:

$0.4 < f1/f23 < 1.7$;

$2.8990 \leq =R2/R3 < 4.3$.

2. The optical lens system as claimed in claim 1, wherein the third lens element has the object-side surface being concave near the optical axis, and the fourth lens element has the image-side surface being concave near the optical axis.

3. The optical lens system as claimed in claim 1, wherein a focal length of the second lens element is f2, a focal length of the third lens element is f3, and they satisfy the relation: $-4.2 < f2/f3 < -1.3$.

4. The optical lens system as claimed in claim 1, wherein a focal length of the third lens element is f3, a focal length of the fourth lens element is f4, and they satisfy the relation: $-1.1 < f3/f4 < -0.4$.

5. The optical lens system as claimed in claim 1, wherein the focal length of the first lens element is f1, a focal length of the third lens element is f3, and they satisfy the relation: $0.7 < f1/f3 < 2.1$.

6. The optical lens system as claimed in claim 1, wherein a focal length of the second lens element is f2, a focal length of the fourth lens element is f4, and they satisfy the relation: $0.55 < f2/f4 < 4.0$.

7. The optical lens system as claimed in claim 1, wherein the focal length of the second lens element and the third lens element combined is f23, a focal length of the fourth lens element is f4, and they satisfy the relation: $-1.3 < f23/f4 < -0.6$.

8. The optical lens system as claimed in claim 1, wherein a focal length of the first lens element and the second lens element combined is f12, a focal length of the third lens element and the fourth lens element combined is f34, and they satisfy the relation: $0.3 < f12/f34 < 2.2$.

9. The optical lens system as claimed in claim 1, wherein a focal length of the optical lens system with a wide field of view is f, a distance from the object-side surface of the first lens element to an image plane along the optical axis is TL, and they satisfy the relation: $0.5 < f/TL < 0.8$.

10. The optical lens system as claimed in claim 1, wherein the optical lens system has a maximum view angle FOV, and it satisfies the relation: $75 < FOV < 95$.

11. The optical lens system as claimed in claim 1, wherein a central thickness of the first lens element along the optical axis is CT1, a central thickness of the second lens element along the optical axis is CT2, and they satisfy the following relation: $0.2 < CT2/CT1 < 0.7$.

12. The optical lens system as claimed in claim 1, wherein a distance along the optical axis between the first lens element and the second lens element is T12, a central thickness of the second lens element along the optical axis is CT2, and they satisfy the following relation: $0.05<T12/CT2<1.25$.

13. The optical lens system as claimed in claim 1, wherein an Abbe number of the first lens element is V1, an Abbe number of the second lens element is V2, and they satisfy the following relation: $30<V1-V2<42$.

14. The optical lens system as claimed in claim 1, wherein the focal length of the first lens element is f1, a focal length of the second lens element is f2, and they satisfy the relation: $-0.9<f1/f2<-0.3$.

* * * * *